United States Patent
Umemoto

(10) Patent No.: US 8,982,300 B2
(45) Date of Patent: Mar. 17, 2015

(54) VIEWING ANGLE CONTROLLING SYSTEM, AND IMAGE DISPLAY DEVICE USING THE SAME

(75) Inventor: Seiji Umemoto, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 851 days.

(21) Appl. No.: 12/334,834

(22) Filed: Dec. 15, 2008

(65) Prior Publication Data

US 2009/0153783 A1 Jun. 18, 2009

(30) Foreign Application Priority Data

Dec. 17, 2007 (JP) .................................. 2007-325050

(51) Int. Cl.
*G02F 1/1335* (2006.01)
*G02B 27/28* (2006.01)

(52) U.S. Cl.
CPC .......... *G02B 27/28* (2013.01); *G02F 1/133528* (2013.01); *G02F 2001/133531* (2013.01)
USPC .......................................................... 349/96

(58) Field of Classification Search
USPC .......................................................... 349/96
See application file for complete search history.

(56) References Cited

U.S. PATENT DOCUMENTS

| | | | |
|---|---|---|---|
| 5,889,614 A * | 3/1999 | Cobben et al. | 359/484.09 |
| 6,124,907 A * | 9/2000 | Jones et al. | 349/96 |
| 6,515,785 B1 * | 2/2003 | Cobb et al. | 359/247 |
| 6,683,717 B1 * | 1/2004 | Miyatake et al. | 359/487.06 |
| 7,712,908 B2 | 5/2010 | Hoshi et al. | |
| 7,918,571 B2 | 4/2011 | Hoshi et al. | |
| 2002/0048639 A1 * | 4/2002 | Negoro et al. | 428/1.2 |
| 2002/0089840 A1 * | 7/2002 | Kawakami et al. | 362/31 |
| 2003/0090619 A1 * | 5/2003 | Kumagai et al. | 349/194 |
| 2005/0213012 A1 | 9/2005 | Yano et al. | |
| 2006/0158593 A1 * | 7/2006 | Sakai et al. | 349/122 |
| 2008/0247192 A1 | 10/2008 | Hoshi et al. | |
| 2010/0157205 A1 | 6/2010 | Kiya et al. | |
| 2010/0188608 A1 | 7/2010 | Hoshi et al. | |

FOREIGN PATENT DOCUMENTS

| | | |
|---|---|---|
| GB | 2418518 A | 3/2006 |
| JP | 06-067020 A | 3/1994 |
| JP | 9-127885 A | 5/1997 |
| JP | 2001-305312 A | 10/2001 |
| JP | 2004-272202 A | 9/2004 |

(Continued)

OTHER PUBLICATIONS

Abstract machine translation of jp 05-157914.*

(Continued)

*Primary Examiner* — Lucy Chien
(74) *Attorney, Agent, or Firm* — Westerman, Hattori, Daniels & Adrian, LLP

(57) ABSTRACT

There are provided a viewing angle controlling system which can be used in a display device for which peep-prevention and viewing-angle-control are required, and makes it possible to control the viewing angle of a display, and an image display device using the same. The viewing angle controlling system includes: a first polarizer and a second polarizer which are each in the form of a film comprising an absorption dichroic material. The first polarizer has an absorption axis in its film plane, and the second polarizer has an absorption axis in the range of angle from 0 to 45° to the normal line of its film plane.

21 Claims, 15 Drawing Sheets

(56) References Cited

FOREIGN PATENT DOCUMENTS

| | | |
|---|---|---|
| JP | 2005-054171 A | 3/2005 |
| JP | 2005-309386 A | 11/2005 |
| JP | 2006-91871 A | 4/2006 |
| JP | 2007-279146 A | 10/2007 |
| JP | 2007-286573 A | 11/2007 |
| JP | 2007-292966 A | 11/2007 |
| JP | 2008-275976 A | 11/2008 |

OTHER PUBLICATIONS

Japanese Office Action dated Jan. 6, 2011, issued in corresponding Japanese Patent Application No. 2007-325050.

Japanese Office Action dated Feb. 26, 2010, issued in corresponding Japanese Patent Application No. 2007-325050.

Japanese Office Action dated Dec. 25, 2012, issued in corresponding Japanese Patent Application No. 2011-289632, with English translation (3 pages).

* cited by examiner

FIG.3C1
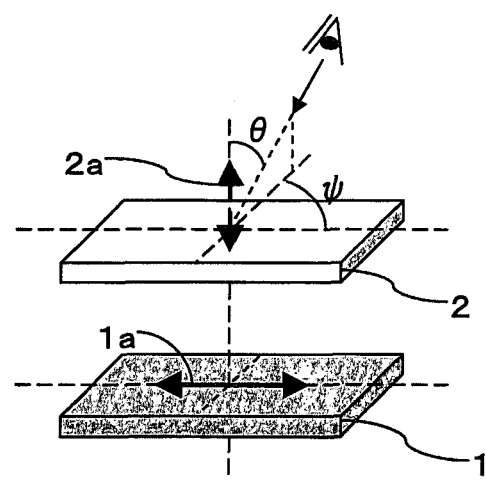
FIG.3C2
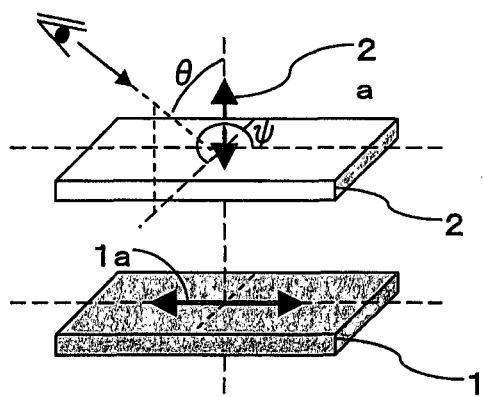

FIG.5C1
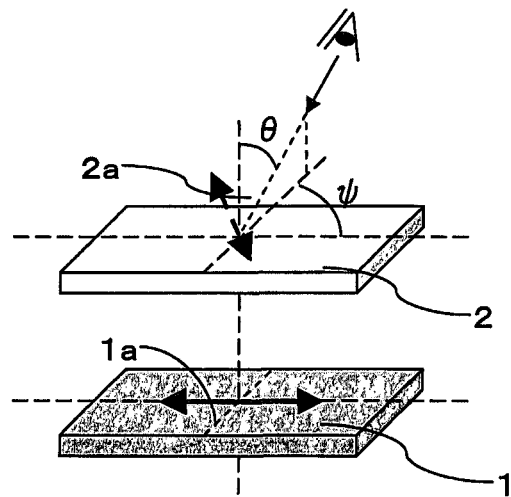
FIG.5C2
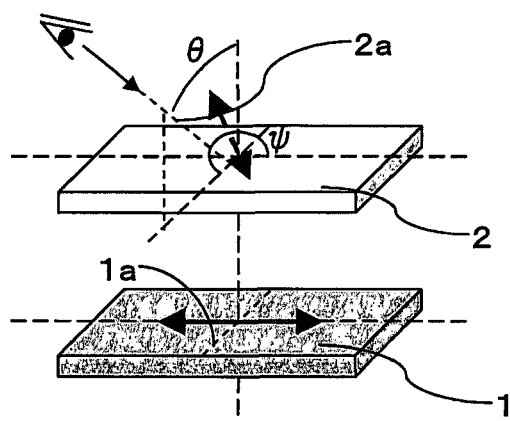
FIG.5D
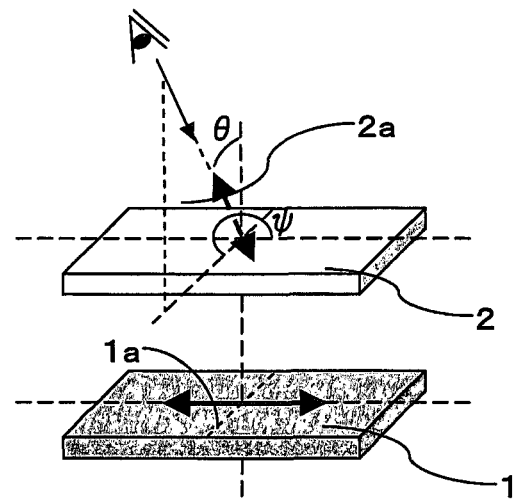

VIEWING ANGLE CONTROLLING SYSTEM, AND IMAGE DISPLAY DEVICE USING THE SAME

BACKGROUND OF THE INVENTION

1. Field of the Invention

The present invention relates to a viewing angle controlling system, and an image display device using the same.

2. Description of the Related Art

Image display devices, such as liquid crystal displays (LCD), plasma display devices (PDP) and EL display devices (ELD), are used for various purposes and scenes since the display devices have advantageous characteristics that: the display devices may be thin and light; the power consumption thereof is low; the screen thereof can be made large and the like. In particular, LCDs or ELDs are widely used as display devices of personally-used information devices, such as notebook computers or cellular phones. In some cases, such an information device is used to handle data including personal data, trade secrets or the like. However, the device has such a risk that its screen is peeped by others on a platform of a station, or in a public facility such as a coffee shop or on a train so that privacy is invaded, confidential information leaks out, or the like. Further, in the same case as in an automatic teller machine (ATM) or others, there would be a risk that a personal identification number or the like is peeped when the machine is operated, so that information leaks out. In the meantime, in the case of displays adapted for cars, such as a car navigation system, there is caused a problem that light emitted upwards from the display is projected on the front window, in particular, in driving at night so that the visual field of the outside may be shut out.

It is stated that out of the above-mentioned image display devices, LCDs are "narrow in viewing angle" in comparison with selfluminous-type display devices such as CRTs, ELDs and PDPs. In order to enlarge the viewing angle thereof, compensation films are used. In such a case, the wording "narrow in viewing angle" precisely means that "the viewing angle at which a good display property is exhibited is narrow". In other words, even in a display device which is generally said to be "narrow in viewing angle", light for display information is emitted in every direction; thus, there remains a possibility that information is read out by peep or the like of other persons, and the problems of the projection of the light and the like are not solved. From such a viewpoint, it is necessary to control the quantity of light emitted from the image devices in accordance with the emission angle thereof, thereby decreasing the light emission into an unnecessary direction or into a direction along which the light quantity is desired to be limited into an extent that information based on the light cannot be read out.

Against such a problem, a film in which louvers are physically formed in the form of a bamboo blind, or the like is used between protective films such as PET films (see, for example, JP-A-2001-305312). Such a film is also called a light control film or the like, and is already commercially available. The film in which louvers are formed, is, for example, a film as illustrated in FIG. 2, wherein a large number of light-absorbable louvers 202 are fitted to protective films 203 at a right angle or a predetermined angle. By adjusting the height of the louvers 202, the arrangement interval between the louvers 202 and a translucent layer 201, or the arrangement angle between the louvers 202 and the protective films 203, or by laminating a plurality of such structure units 200 onto each other, various viewing-angle-controls can be attained.

As disclosed in JP-A-2001-305312, such a louver film is produced by a method of laminating transparent layers, which will be translucent regions, and colored layers, which will be louver regions, alternately so as to have a required size; slicing the resultant; and then laminating protective films onto two surfaces thereof. For this reason, considerably complicated steps are required for the production, thereby causing problems that cost of a louver film increases and the design for viewing-angle-control is lacking in flexibility. Additionally, the number of the lamination of transparent layers and colored layers is restricted, so that the lamination thickness becomes a factor for deciding the size of the louver film. Thus, the area thereof is not easily made large.

SUMMARY OF THE INVENTION

In light of the above-mentioned situation, an object of the invention is to provide a viewing angle controlling system which can be used in a display device for which peep-prevention and viewing-angle-control are required, and makes it possible to control the viewing angle of a display, and an image display device.

The object can be attained by the invention described below. That is, the invention relates to a viewing angle controlling system including a first polarizer and a second polarizer which are each in the form of a film containing an absorption dichroic material. As shown in FIG. 1, the first polarizer 1 has an absorption axis 1a in its film plane, and the second polarizer 2 has an absorption axis 2a in the range of angle from 0 to 45° to the normal line of its film plane.

The apparent absorption axis of the polarizer is changed in accordance with the direction along which the polarizer is viewed; however, in the viewing angle controlling system of the invention, the two polarizers, which show different absorption axis directions, are used to make it possible to attain the viewing-angle-control by use of a change in the angle relationship between the apparent absorption axes of these polarizers, and the light ray transmittance thereof in accordance with the viewing direction.

In the viewing angle controlling system of the invention, it is preferred that the angle made between a plane including the normal line of the film plane of the second polarizer and the absorption axis thereof, and the absorption axis of the first polarizer is 90°±5°. The arrangement of the two polarizers at an angle in this range makes it possible to make the viewing-angle-control property more remarkable.

Further, in the viewing angle controlling system of the invention, it is also preferred that in a case where the system has a medium 30 between the first polarizer 1 and the second polarizer 2, wherein the medium does not cause a substantial change of the polarization state of light in the normal line direction of the film plane of the second polarizer 2. If the polarization state is changed by the medium between the first polarizer and the second polarizer, a desired viewing-angle-control property may not be obtained.

An aspect of the medium, which does not cause a substantial change of the polarization state of light in the normal line direction of the film plane of the second polarizer, is the medium in which the in-plane retardation is 40 nm or less. It is also a preferred aspect that the slow axis of the medium 30 is parallel or perpendicular to the absorption axis 1a of the first polarizer 1.

Furthermore, in the viewing angle controlling system of the invention, it is preferred that the thickness direction retardation of the medium is 60 nm or less in order to obtain a desired viewing-angle-control property.

Furthermore, in the viewing angle controlling system of the invention, it is preferred that the first polarizer 1 and the second polarizer 2 are adhered and integrated with each other with a pressure-sensitive adhesive layer and/or an adhesive layer interposed therebetween. When the polarizers are adhered and integrated with each other, it is possible to restrain the generation of unevenness following a contraction of the films, or decrease a loss of light by reflection.

Furthermore, an aspect of the viewing angle controlling system of the invention may have a pressure-sensitive adhesive layer over at least one of a principle surface of first-polarizer-side or a principle surface of second-polarizer-side.

Furthermore, as shown in FIGS. 10, 11, 12, 13, and 14, the invention relates to an image display device in which the viewing angle controlling system 100 is arranged over at least one principle surface of a display panel.

In the image display device of the invention, it is preferred that the first-polarizer-side principle surface of the viewing angle controlling system is arranged to be positioned on the display panel side. This structure makes it possible that a single polarizer functions as both of the polarizer of the display device and the polarizer of the viewing angle controlling system.

Further, in the image display device of the invention, it is preferred that the display panel and the viewing angle controlling system are adhered and integrated with each other with a pressure-sensitive adhesive layer and/or an adhesive layer interposed therebetween.

Further, as shown in FIG. 12, it is also a preferred embodiment that a transparent plate 304 is arranged over at least one principle surface of the display panel, and the transparent plate 304 and the viewing angle controlling system 100 are adhered and integrated with each other with a pressure-sensitive adhesive layer and/or an adhesive layer 4 interposed therebetween, thereby rendering the second-polarizer principle surface side of the viewing angle controlling system on the display panel 300.

Furthermore, it is preferred that the image display device of the invention shows a viewing-angle-restricted direction perpendicular to the absorption axis direction of the first polarizer.

Furthermore, as shown in FIG. 11, it is preferred that in the case where the display panel is a liquid crystal display 300 having a polarizer 1 over at least one principle surface of a liquid crystal cell, the polarizer functions as the first polarizer 1 of the viewing angle controlling system 100. According to this embodiment, the number of members can be reduced, and the reduction can contribute to the matter that the liquid crystal display is made thin, light, and inexpensive.

Further, as shown in FIG. 14, another preferred embodiment of the image display device of the invention includes a selfluminous-type display panel 500, and the viewing angle controlling system 100 is arranged on the viewing side of the display panel. It is preferred that the display device has a circular polarization means 5 between the first polarizer 1 of the viewing angle controlling system 100 and the display panel 300. And the circular polarization means converts linearly polarized light to approximate circularly polarized light. Arranging the viewing angle controlling system on the viewing side of the display panel, viewing-angle-control can be attained. Moreover, the circular polarization means makes it possible to give an anti-reflective function to the image display device, thereby preventing a fall in bright-site contrast, which is caused by reflection on the interface of the selfluminous-type display device.

BRIEF DESCRIPTION OF THE DRAWINGS

FIGS. 3A, 3B, 3C1, and 3C2 are explanatory views each illustrating the viewing direction in the case where the absorption axis direction of the second polarizer is parallel to the normal line direction of the film plane. Each solid line with two arrows represents the absorption axis direction of the first polarizer, and each broken line with two arrows represents the absorption axis direction of the second polarizer in the views.

FIGS. 4A, 4B, 4C1 and 4C2 are views which schematically illustrate a situation that the relationship between the apparent absorption axes of the first polarizer and the second polarizer is changed in accordance with the viewing direction when the absorption axis direction of the second polarizer is parallel to the normal line direction of the film plane. Each solid line with two arrows represents the absorption axis direction of the first polarizer, and each broken line with two arrows represents the absorption axis direction of the second polarizer in the views.

FIGS. 5A, 5B, 5C1, 5C2 and 5D are explanatory views each illustrating the viewing direction in the case where the absorption axis direction of the second polarizer is inclined from the normal line direction of the film plane. Each solid line with two arrows represents the absorption axis direction of the first polarizer, and each broken line with two arrows represents the absorption axis direction of the second polarizer in the views.

FIGS. 6A, 6B, 6C1, 6C2 and 6D are views which schematically illustrate a situation that the relationship between the apparent absorption axes of the first polarizer and the second polarizer is changed in accordance with the viewing direction when the absorption axis direction of the second polarizer is inclined from the normal line direction of the film plane. Each solid line with two arrows represents the absorption axis direction of the first polarizer, and each broken line with two arrows represents the absorption axis direction of the second polarizer in the views.

FIG. 15A shows the angle-dependency of the white brightness of the image display device of Example 1, FIG. 15B shows that of the image display device of Example 2, and FIG. 15C shows that of the image display device of Comparative Example 1.

DETAILED DESCRIPTION OF THE PREFERRED EMBODIMENTS

Figure 1:
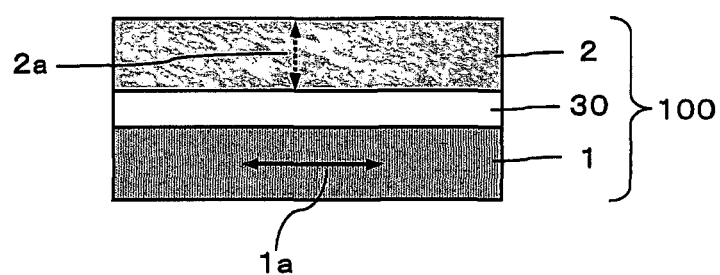
FIG. 1 is a sectional view of the basis structure of the viewing angle controlling system of the invention.

As illustrated in FIG. 1, the viewing angle controlling system of the invention has a first polarizer 1 and a second polarizer 2. The system may have, as an optional constituent, a medium 30 such as a pressure-sensitive adhesive layer, an adhesive layer or a protective film between the first polarizer and the second polarizer. Polarizers are classified, in the field of crystal optics, into "O type polarizers", and "E type polarizers". "O type polarizers" which has a transmission axis along an ordinary ray (O) axial direction and an absorption axis along an extraordinary ray (E) axial direction, which are called in the field of crystal optics. "E type polarizers" has a transmission axis along an extraordinary ray (E) axial direction and an absorption axis along an ordinary ray (O) axial direction. In the viewing angle controlling system of the invention, O type polarizers are used as both of the first polarizer and the second polarizer.

The first polarizer used in the viewing angle controlling system of the invention is a polarizer formed in a film form. As the first polarizer, an ordinary O type polarizer may be appropriately used which contains an absorption dichroic material and has an absorption axis 1a in the film plane thereof. Example of such polarizers include a known polarizer obtained by causing a dichroic material, such as iodine or a dichroic dye, to be adsorbed onto a hydrophilic polymer film, such as a polyvinyl alcohol based film, a partially-formalized polyvinyl alcohol based film or a partially-saponified ethylene/vinyl acetate copolymer based film, and then drawing the resultant monoaxially; a polyene based aligned film such as a film made of a product obtained by subjecting polyvinyl alcohol to dehydrating treatment or a product obtained by subjecting polyvinyl chloride to hydrochloric-acid-removing treatment; and a polarizer obtained by coating a liquid crystalline dichroic dye and then aligning the resultant.

In many cases, the first polarizer is used so as to function as a polarizer used in an ordinary liquid crystal display. The first polarizer is not particularly limited as far as the polarizer that can be generally used as a polarizer of a liquid crystal display. As the first polarizer, an iodine-containing linear polarizer can be preferably used from the viewpoint of polarization performances such as transmittance or polarization degree, and a dye type polarizer or a polyene-based polarizer can be preferably used from the viewpoint of durability.

The second polarizer used in the viewing angle controlling system of the invention is a polarizer formed in a film form. As the second polarizer, polarizer containing an absorption dichroic material and having absorption axis 2a in the range of angle from 0 to 45° to the normal line of the film plane. Details of the viewing angle controlling principle of the viewing angle controlling system of the invention will be described later. The viewing angle property and the viewing properties, such as the transmittance, are easily affected by optical properties of the second polarizer. It is therefore preferred that the polarization property of the second polarizer is higher.

The materials such as those in which a dichroic compound is aligned in a liquid crystal polymer matrix is preferably used for the polarizer, but the material and the production process of such polarizers are not particularly limited. From the viewpoint of making the vertical alignment property high and realizing a high dichroic ratio, it is particularly preferred to align a liquid crystal compound by using a substrate exhibiting vertical alignment property.

Examples of such substrate, which is capable of aligning a liquid crystal compound vertically, include a glass substrate, a metallic plate such as aluminum or stainless steel, an inorganic material such as an inorganic oxide, an organic material or the like. Examples of the glass substrate include, in addition to ordinary glass plates, a thin glass film obtained by forming glass into a film having a thickness of 0.1 mm or less, and then winding the film into a roll form (such as #100 and AF35 manufactured by Matsunami Glass Ind., Ltd.), and a resin film onto which this glass film is adhered. Examples of the metallic plate include such as a plate or a thin plate of aluminum or stainless steel, or a product obtained by plating a resin film with the metal or evaporating the metal onto a resin film. Specific examples thereof include such as aluminum-evaporated PET films or stainless steel evaporated films manufactured by Toray Advanced Film Co., Ltd. and Oike & Co., Ltd.; and a rolled aluminum foil and a PET-substrate-attached rolled aluminum foil manufactured by Toyo Aluminum K.K. Examples of the inorganic oxide include such as a $SiO_2$-evaporated PET film and an ITO-evaporated PET film manufactured by Oike & Co., Ltd. As the organic material, a film made of a hydrophobic resin film is preferably used. Examples thereof include such as a norbornene based resin film and a fluorine-based resin. Examples of the norbornene based resin film include such as a non-drawn ZEONOR FILM manufactured by Optes Inc. Examples of the fluorine-based resin film include Teflon resin films manufactured by Du Pont Kabushiki Kaisha, and films made of such as ETFE or PTFE (polytetrafluoroethylene) manufactured by Asahi Glass Co., Ltd. In the case that an opaque substrate such as a metallic plate or an inorganic-oxide-evaporated film is used as the substrate for aligning a liquid crystal compound, the polarizer is preferred manufactured by forming an alignment layer of a liquid crystal compound on the opaque substrate then transferring the alignment layer onto a substrate having high light transmittance, such as a transparent film.

Examples of the liquid crystal polymer matrix include such as thermotropic liquid crystal polymer matrixes and crosslinkable liquid crystal polymer matrixes. Examples of a product in which a dichroic dye is aligned in such a liquid crystal polymer matrix include products described in such as JP-A-11-101964, JP-A-11-160538, JP-A-2001-330726, JP-A-2001-133630, JP-A-2005-99065, and Nitto Technical Report Vol. 135, No. 1, p. 79 (1997).

In particular, in order to make the liquid crystal polymer highly aligned, it is preferred to use a method of coating a mixture of a liquid crystal monomer having a polymerizable functional group and a dichroic dye onto a substrate, and then radiating radial rays such as ultraviolet rays thereto so as to polymerize the liquid crystal monomer, thereby fixing the alignment. This method is preferred for an improvement in the durability, since such a polymerization on an aligned substrate causes the fixation of the alignment as well as the enhancement of the degree of alignment. Furthermore, in the case of applying an electric field or a magnetic field in a direction along which the liquid crystal molecules are desired to be aligned, such as the direction of the normal line of the film plane or an oblique direction, at the time of the radiation of the radial rays, the alignment of the liquid crystal polymer can be furthermore enhanced or the alignment direction can be controlled.

Further, an additive may be used for the purpose of enhancing the vertical alignment property. An example of the additive for enhancing the vertical alignment property includes, for example, a side chain type liquid crystal polymer containing a monomer unit having a liquid crystal fragment side chain having positive refractive index anisotropy and a monomer unit having a non-liquid-crystal fragment side chain. As such a liquid crystal compound, for example, a compound described in JP-A-2003-149441 may be used.

The dichroic dye is a dye exhibiting different absorbances to an incident ray between the long axis and the short axis of the molecule. Correspondingly to the monoaxial alignment of the liquid crystal polymer or the like, the long axes of the molecules are aligned in a predetermined direction. The dichroic dye selectively absorbs and transmits vibration components included in the incident ray so as to convert the ray to polarized light. The dye that has a high dichroic ratio is preferably an azo based dye, a perylene based dye, a pentacene based dye or an anthraquinone based dye, which is preferably used in dye type polarizers, or a dye mixture thereof. Such dyes are detailed in JP-A-54-76171 or the like. Further, it is also allowable to use, for example, a material containing a liquid crystal dichroic dye as described in, for example, JP-A-2005-140986 instead of the incorporation of a dichroic dye into the liquid crystal polymer matrix. One or two or more kinds of the dichroic dye may be used in accordance with the wavelength range of the polarization property or the like. The amount thereof used is generally from 1 to 20% by weight based on the liquid crystal polymer or liquid crystal monomer.

As described above, it is preferred that the dichroic ratio of the second polarizer is high. In the case of using a dichroic dye in the matrix of a thermotropic liquid crystal polymer or a crosslinkable liquid crystal polymer, the dichroic ratio thereof is preferably 25 or more, more preferably 30 or more, and even more preferably 50 or more.

The dichroic ratio of a polarizer having an absorption axis other than inside of the film plane cannot be directly measured. In the present specification, however, the value is defined as follows: First, the transmittance of the second polarizer in the normal line direction, that is, in the absorption axis direction is represented by $K_1$. Here, linearly polarized light is used originally as incident light, however, the second polarizer is vertically aligned; thus, the transmittance to natural light and that to linearly polarized light are regarded as being equal to each other. The transmittance to natural light is represented by $K_1$.

Next, a horizontally aligned polarizer having the same composition is produced in order to measure the transmittance $K_2$ in the transmission axis direction. This horizontally aligned polarizer is obtained by developing, aligning and fixing a solution containing a liquid crystal compound having the same composition as the solution for producing the second polarizer onto a horizontally aligned film. As the horizontally aligned polarizer, an aligned film obtained by forming a polyimide film onto a glass plate and then rubbing the film is used at this time. Further, the fixation of the alignment is attained by applying a horizontal electric field of 2 kV to the aligned film along the rubbing direction, heating the workpiece in the presence of the electric field, cooling the workpiece to align the liquid crystal monomer, and then radiating UV to the workpiece to fix the alignment. Linearly polarized light is radiated into the thus produced horizontally aligned polarizer, the light being parallel to the absorption axis direction of this polarizer, that is, the alignment direction. The transmittance $K_2$ thereof is then measured.

Using $K_1$ and $K_2$ obtained as described above, the dichroic ratio D of the second polarizer is represented by the following:

$$D = \log K_2 / \log K_1$$

Strictly saying, in the measurement of the dichroic ratio, it may be necessary to consider the effect of a reflection loss on the film surface. However, the effect, in general, is negligible; thus, the above equation is used in the present specification.

According to the measuring method as well as the equation, the vertical alignment property of the vertically aligned second polarizer is at a lower level means the absorbance of light rays in the normal line by the dichroic material aligned in the direction of the film plane. It is therefore understood that the value of the transmittance $K_1$ becomes smaller so that as a result, the dichroism of the second polarizer lowers.

The following will describe the principle of the control of the viewing angle of a display device based on the viewing angle controlling system of the invention. The viewing angle controlling system of the invention makes use of changes of the apparent absorption axis directions or the light transmittances of polarizers in accordance with the viewing angle, so as to control the quantity of light emitted therefrom in accordance with the viewing angle, thereby restraining light emission into unnecessary directions or directions along which the quantity of the light is desired to be limited.

FIGS. 3A, 3B, 3C1 and 3C2 illustrate various aspects in the viewing direction. Referring to these Figures, changes of the apparent absorption axis direction of the polarizers are described. In the case where the system is viewed along the normal line direction of the film plane, that is, from the front (polar angle θ=0°) as illustrated in the viewing direction in FIG. 3A, in the case where the system is viewed along a direction in which the azimuth angle of the viewing direction is consistent with the absorption axis 1a of the first polarizer 1, that is, along a direction in which the azimuth angle ψ of the viewing direction is 0° or 180° (provided that the absorption axis direction of the first polarizer is rendered the base (0°) of the azimuth angle ψ) even when the viewing direction is an oblique direction (polar angle θ≠0) as illustrated in the viewing direction in FIG. 3B, or in the case where the system is viewed along a direction in which the azimuth angle of the viewing direction is perpendicular to the absorption axis 1a of the first polarizer 1, that is, along a direction in which the azimuth angle ψ of the viewing direction is 90° or 270° as illustrated in the viewing direction in FIG. 3C1 or 3C2, the direction of the apparent absorption axis 1a of the first polarizer 1 is not varied. On the other hand, when the system is viewed along oblique direction other than the above directions, the azimuth angle of the apparent absorption axis 1a of the first polarizer 1 is varied to make the angle between the azimuth angle of the apparent absorption axis of the first polarizes 1 and the azimuth angle of the viewing direction large.

When the absorption axis 2a direction of the second polarizer 2 in the viewing angle controlling system of the invention is substantially parallel to the normal line direction of the film plane, the quantity of light emitted therefrom is controlled in accordance with the viewing angle. This matter will be described based on change of the apparent absorption axis directions 1a and 2a of the first polarizer 1 and the second polarizer 2.

Figure 2:
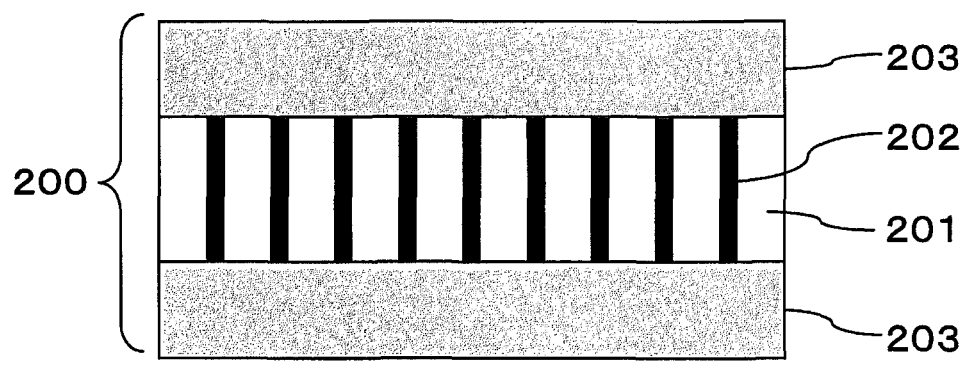
FIG. 2 is a sectional view of an example of the structure of a viewing angle controlling system in the prior art in which louvers 202 are formed.
Figure 3A:
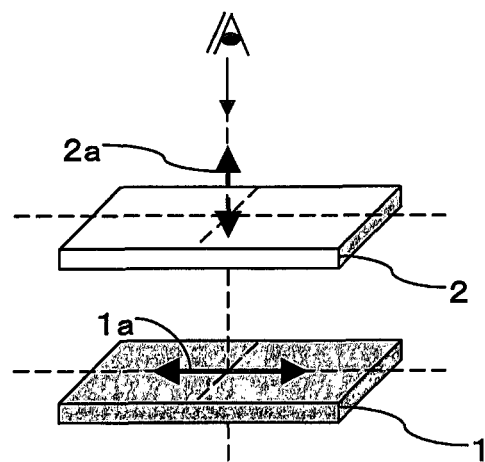
Figure 3B:
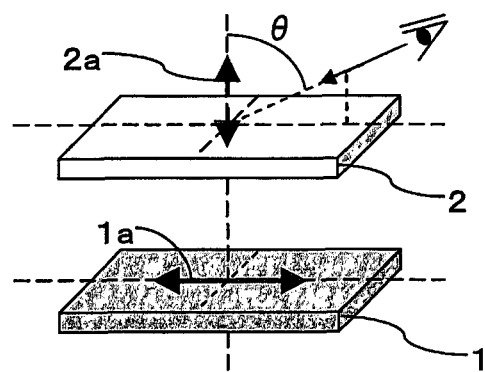
Figure 4A:
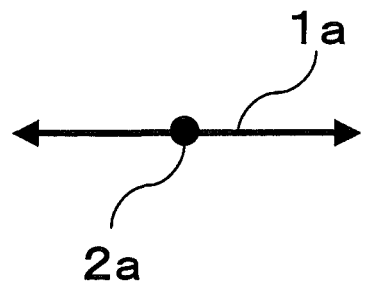

FIGS. 4A, 4B, 4C1 and 4C2 illustrate apparent absorption axis directions in the viewing directions illustrated in FIGS. 3A, 3B, 3C1 and 3C2, respectively. Here, two arrows of each solid represent the apparent absorption axis 1a direction of the first polarizer 1, and two arrows of each broken line represent the absorption axis 2a direction of the second polarizer 2. When the viewing angle controlling system is viewed from the front, that is, along the direction in which the polar angle θ is 0° as illustrated in the viewing direction in FIG. 3A, the observer comes to view the viewing angle controlling system along the direction parallel to the absorption axis 2a of the second polarizer 2. As illustrated in FIG. 4A, in this case, absorption through the dichroic material of the second polarizer 2 is not expressed so that light emitted from the first polarizer 1 is transmitted, as it is, through the second polarizer 2. Actually, the second polarizer 2 is not completely transparent in the transmission axis direction of the dichroic material, that is, the ordinary ray (O) axial direction, and further the alignment of the dichroic material is not completely directed to a single direction. Thus, slight absorption may be generated, however, the in-plane anisotropy of the film is as small as it can be ignored. As a result, no polarization is generated. For this reason, when the system is viewed from the front, the polarization state of light emitted from the first polarizer 1 is not converted by means of the second polarizer 2 except that the light is slightly absorbed.

Figure 4B:
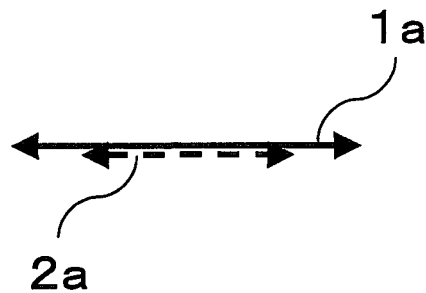
Figure 4B:
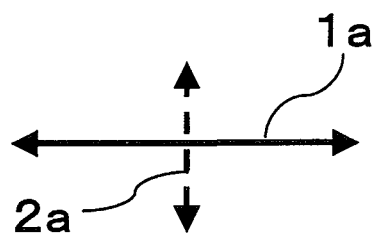
Figure 4B:
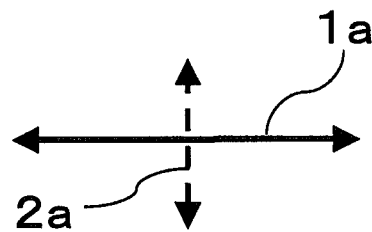

When the system is viewed along an oblique direction in which the absorption axis 1a of the first polarizer 1 is consistent with the azimuth angle of the viewing direction, that is, along a direction in which the polar angle $\theta$ is not 0° and the azimuth angle of the viewing direction $\psi$ is 0° or 180° (provided that the absorption axis direction of the first polarizer is rendered the base (0°) of the azimuth angle $\alpha$) as illustrated in the viewing direction in FIG. 3B, the absorption axis 1a of the first polarizer 1 and the absorption axis 2a of the first polarizer 2 become apparently parallel to each other, that is, become into a parallel Nicol state as illustrated in FIG. 4B. Thus, light emitted from the first polarizer 1 is hardly absorbed by the second polarizer 2, and further the viewing angle becomes large, in other words, even if the polar angle $\theta$ becomes large, the quantity of light transmitted through the viewing angle controlling system of the invention is large as it is.

On the other hand, when the system is viewed along a direction in which the azimuth angle of the viewing direction is perpendicular to the absorption axis 1a of the first polarizer 1, that is, along a direction in which the polar angle $\theta$ is not 0° and the azimuth angle $\gamma$ of the viewing direction is 90° or 270° as illustrated in the viewing direction in FIG. 3C1 or 3C2, the absorption axis 2a of the second polarizer 2 is apparently expressed in a direction parallel to the viewing direction. The absorption axis 1a of the first polarizer 1 does not apparently change. Thus, as illustrated in FIGS. 4C1 and 4C2, the absorption axis 1a of the first polarizer 1 and the absorption axis 2a of the second polarizer 2 become perpendicular, that is, become into a cross Nicol relationship. As a result, light emitted from the first polarizer 1 is absorbed by the second polarizer 2. Furthermore, the viewing angle becomes large, that is, the polar angle $\theta$ becomes large and at the same time the absorption vector component in the extraordinary ray (E) axial direction becomes large, whereby the absorbance increases and further the optical path length increases. Thus, light absorption through the second polarizer 2 increases. Accordingly, in the case where the viewing angle controlling system is viewed along the direction perpendicular to the absorption axis 1a of the first polarizer 1, the quantity of light transmitted through the system decreases as the viewing angle increases. Thus, when viewed along this direction, information displayed on a display device becomes remarkably difficult to view. As a result, viewing-angle-control is attained.

Here, FIGS. 3C1 and 3C2 illustrate viewing directions in which the polar angles $\theta$ are equal to each other and the azimuth angles are different from each other by 180°, however, as illustrated in FIGS. 4C1 and 4C2, the arrangement of the apparent absorption axis 1a of the first polarizer 1 is not varied; thus, light absorption through the second polarizer 2 is not also varied. In other words, it is understood that the two cases show viewing-angle-control properties symmetric with respect to the normal line of the film plane.

Further, when the viewing angle controlling system of the invention is viewed along a viewing direction other than the above directions, that is, a direction other than the directions in which the polar angle $\theta$ is not 0° and the azimuth angle $\psi$ is not any one of 0°, 90°, 180° or 270°, the transmittance lowers based on the angle made between the absorption axes of the first polarizer 1 and the second polarizer 2. The apparent absorption axis 1a of the first polarizer 1 is changed in accordance with the polar angle $\theta$ and the azimuth angle $\psi$ of the viewing direction. This change becomes maximum in directions in which the azimuth angle $\psi$ of the viewing direction is 45°, 135°, 225° and 315°, and the change becomes larger as the polar angle $\theta$ of the viewing direction becomes larger. The azimuth angle of the apparent absorption axis 2a of the second polarizer 2 is equal to the azimuth angle of the viewing direction. Moreover, as the polar angle $\theta$ of the viewing direction increases, the light absorption quantity of the second polarizer 2 increases in light of the relationship between the quantity and optical path length.

As described above, the transmittance of the viewing angle controlling system of the invention is decided based on the matter that the angle made between the apparent absorption axes of the first polarizer 1 and the second polarizer 2, and the light absorption quantity are varied in accordance with the viewing direction. As a result, the viewing angle of a display device can be restricted. In other words, as the azimuth angle of the viewing direction is separated farther from the absorption axis direction of the first polarizer, the transmittance of the viewing angle controlling system of the invention decreases; and as the polar angle $\theta$ of the viewing direction becomes larger, the transmittance of the viewing angle controlling system of the invention decreases. For this reason, when the viewing angle controlling system of the invention is combined with a display device, the viewing angle thereof is controlled.

Hereinafter, a case will be described where the absorption axis 2a of the second polarizer 2 is inclined from the normal line direction of the film plane in the viewing angle controlling system of the invention. In this case, the angle made between the absorption axis 2a of the second polarizer 2 and the normal line of the film plane is 45° or less as described above. Furthermore, it is preferred that the angle made between a plane including the normal line of the film plane of the second polarizer 2 and the absorption axis 2a thereof, and the absorption axis 1a of the first polarizer 1 is substantially rectangular. Here, the wording "substantially rectangular" denotes the range of 90°±5°, preferably 90°±3', more preferably 90°±2°. When the angle is set into this range, a viewing angle controlling system having a directive viewing-angle-control range can be obtained. The following will state that the quantity of light emitted from the system is controlled in accordance with the viewing direction based on a change of the apparent absorption axis directions of the first polarizer 1 and the second polarizer 2, in the case where the angle made between the plane including the normal line of the film plane of the second polarizer 2 and the absorption axis 2a thereof and the absorption axis 1a of the first polarizer 1 is rectangular.

FIGS. 5A, 5B, 5C1, 5C2, and 5D are views illustrating various aspects of the viewing direction. FIGS. 6A, 6B, 6C1, 6C2 and 6D illustrate apparent absorption axis directions in the viewing directions illustrated in FIGS. 5A, 5B, 5C, 5C2 and 5D, respectively. Here, two arrows of each solid 1a represent the apparent absorption axis direction of the first polarizer 1, and two arrows of each broken line 2a represent the absorption axis direction of the second polarizer 1. When the viewing angle controlling system is viewed from the front, that is, along the direction in which the polar angle θ is 0° as illustrated in the viewing direction in FIG. 5A, an absorption axis component of the second polarizer 2 is generated as illustrated in FIG. 6A. Therefore, when this case is compared with the case where the absorption axis 2a of the second polarizer 2 is parallel to the normal line direction of the film plane thereof as illustrated in FIG. 4A, the transmittance becomes lower. Still, the angle made between the absorption axis 2a of the second polarizer 2 and the film normal line is 45° or less; thus, the light absorption quantity through the second polarizer 2 is small, and the loss of the transmittance when the system is viewed from the front is small.

Figure 5A:
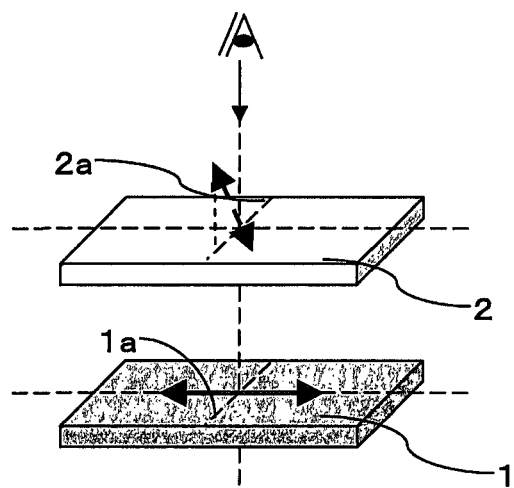
Figure 5B:
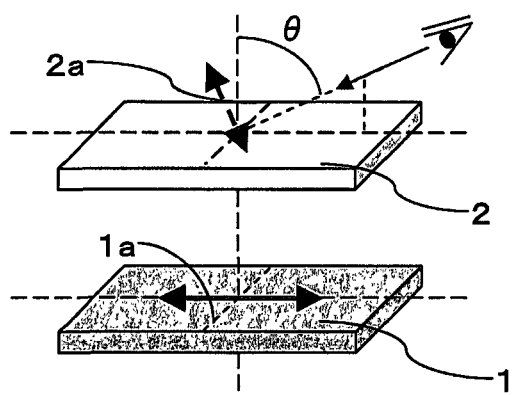
Figure 6A:
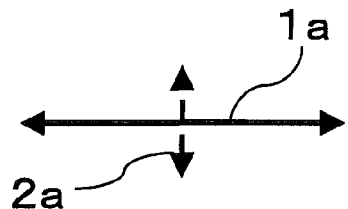
Figure 6B:
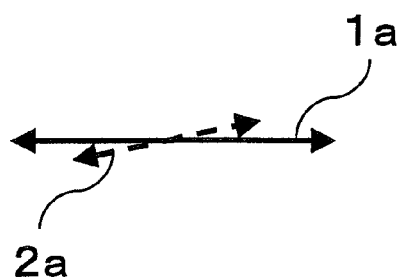
Figure 6B:
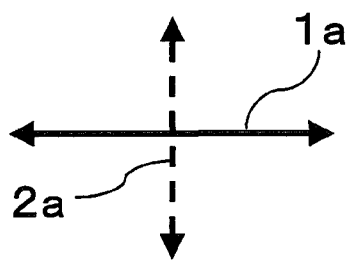
Figure 6B:
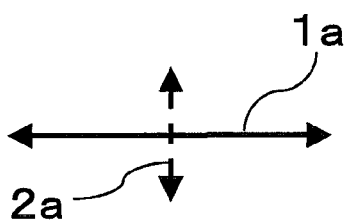

When the system is viewed along an oblique direction in which the absorption axis 1a of the first polarizer 1 is consistent with the azimuth angle of the viewing direction, that is, along a direction in which the polar angle θ is not 0° and the azimuth angle ψ of the viewing direction is 0° or 180° as illustrated in FIG. 5B, the apparent absorption axis 2a of the second polarizer 2 becomes substantially parallel to the absorption axis 1a of the first polarizer 1, as illustrated in FIG. 6B. Thus, a decrease in the transmittance is small. However, when this case is compared with the case illustrated in FIG. 4B, where the apparent absorption axes of the first polarizer 1 and the second polarizer 2 are parallel, light is absorbed, although it is slight, by the second polarizer. Thus, the transmittance thereof becomes small.

On the other hand, when the system is viewed along a direction in which the absorption axis direction of the first polarizer and the azimuth angle are perpendicular to each other, that is, along a direction in which the polar angle θ is not 0° and the azimuth angle ψ is 90° or 270° as illustrated in the viewing direction in FIG. 5C1 or 5C2, the system comes to be observed along the in-plane direction of the plane including the normal line of the film plane of the second polarizer and the absorption axis of the second polarizer on the supposition that the angle made between the plane including the normal line of the film plane of the second polarizer and the absorption axis of the first polarizer is rectangular. In this case, the apparent absorption axis of the second polarizer is expressed in a direction perpendicular to the absorption axis of the first polarizer. That is, the apparent absorption axes of the two polarizers have the relationship of cross Nicol arrangement. Thus, the transmitted light attenuates largely.

Here, FIGS. 5C1 and 5C2 illustrate viewing directions in which the polar angles θ are equal to each other and the azimuth angles are different from each other by 180° in the same manner as in FIGS. 3C1 and 3C2. When the case illustrated in the viewing direction in FIG. 5C1, where the angle made between the viewing direction and the absorption axis 2a of the second polarizer is large, is compared with the case shown in FIG. 4C1, light absorption is made larger by the second polarizer, as illustrated in FIGS. 6C1 and 6C2. On the other hand, when the case illustrated in the viewing direction in FIG. 5C2, where the angle made between the viewing angle and the absorption axis 2a of the second polarizer 2 is small, is compared with the case illustrated in FIG. 4C2, light absorption is made smaller by the second polarizer 2. Thus, it is understood that the system shows a viewing-angle-control property asymmetric with respect to the normal line of the film plane.

Figure 6D:
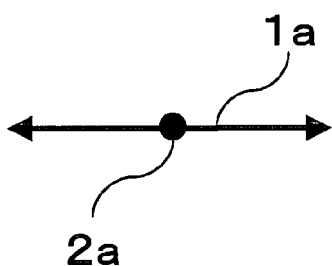

Further, when the viewing angle is parallel to the absorption axis direction of the second polarizer 2, that is, the angle made between the viewing angle and the absorption axis direction is zero as illustrated in the viewing direction in FIG. 5D, absorption through the dichroic material of the second polarizer 2 is not expressed as illustrated in FIG. 6D. Accordingly, light emitted from the first polarizer 1 is transmitted, as it is, through the second polarizer 2. This is the same as in the case illustrated in FIG. 4A. Thus, the polarization state of light emitted from the first polarizer 1 is not converted by the second polarizer 2 except that the second polarizer absorbs a slight quantity of the light. On the other hand, light absorption through the second polarizer 2 becomes larger as the angle made between the viewing direction and the absorption axis direction of the second polarizer becomes larger.

As described above, the viewing angle controlling system of the invention makes use of the principle that the absorption quantity of light through the second polarizer is varied in accordance with the viewing direction. In particular, when the polar angle of the viewing direction is varied in the direction in which the angle made between the absorption axis 1a of the first polarizer 1 and the azimuth angle of the viewing direction is an angle of 90°, as in the case illustrated in the viewing direction in FIG. 3C1 or 3C2 or in the viewing direction in FIG. 5C1 or 5C2, a change in the light absorption quantity thereof is large. In short, the viewing-angle-control property in the direction becomes most remarkable. Further, when the system is viewed along a direction parallel to the absorption axis direction of the second polarizer 2 as illustrated in the viewing direction in FIG. 3A or in the viewing direction in FIG. 5D, light is hardly absorbed by the second polarizer 2 so that the transmittance becomes largest (this direction is defined as "main transmission direction").

In a case where such a principle is used to control, for example, the viewing angle of an image display device in the vertical direction, viewing-angle-control, which is a target of the invention, can be attained by arranging such that the absorption axis direction 1a of the first polarizer 1 is equal to the horizontal direction of the screen.

Incidentally, in the description of the principle of the viewing angle controlling system, a refraction phenomenon in interfaces between the materials is ignored in order to describe the principle more briefly. Actually, however, when light transmitted in the second polarizer is emitted to the viewing side, the difference in refractive index between the second polarizer and the viewing side material (usually, air) produces an effect on the viewing-angle-control effect. Specifically, the transmission angle in the viewing controlling direction is smaller as the refractive index of the second polarizer is lower; and the transmission angle is larger as the refractive index is higher. This is because when light is emitted from the second polarizer to the viewing side, the transmission direction of the light is changed based on Snell laws of reflection, which is a principle for explaining a refraction phenomenon.

Figure 7A:
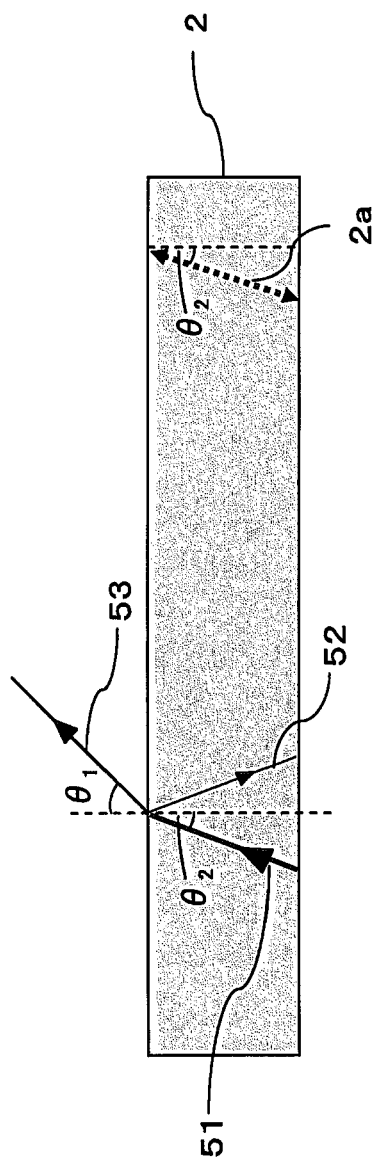
FIGS. 7A and 7B are conceptional views each schematically illustrating a situation that light is reflected or refracted on the surface of the second polarizer. Each broken line with two arrows represents the absorption axis direction of the second polarizer in the views.

In the case where the absorption axis direction of the second polarizer is inclined at an angle of $\theta_2$ from the normal line direction of the film plane, FIG. 7A schematically illustrates the absorption axis direction of the second polarizer and a situation of light being transmitted in a plane including the film normal line. As in the case illustrated in the viewing direction in FIG. 5D, light rays 51 transmitted in a direction parallel to the absorption axis 2a of the second polarizer are partially reflected on the interface of the second polarizer to turn into reflected light rays 52. The remaining light rays are emitted, as transmitted light rays 53, to the viewing side. At this time, the refractive index of the second polarizer and that of the viewing side material are different from each other; thus, the light is refracted into a direction of the polar angle $\theta_1$ and emitted in accordance with Snell laws of reflection represented by the following equation (1):

$$n_1 \times \sin\theta_1 = n_2 \times \sin\theta_2 \tag{1}$$

wherein $n_1$ is the refractive index of the viewing side material and is usually the refractive index of air, which is nearly equal to 1; and $n_2$ is the refractive index of the second polarizer.

The equation (1) can be rewritten into the following equation (2):

$$\sin \theta_1 = (n_2/n_1) \times \sin \theta_2 \qquad (2)$$

Figure 7B:
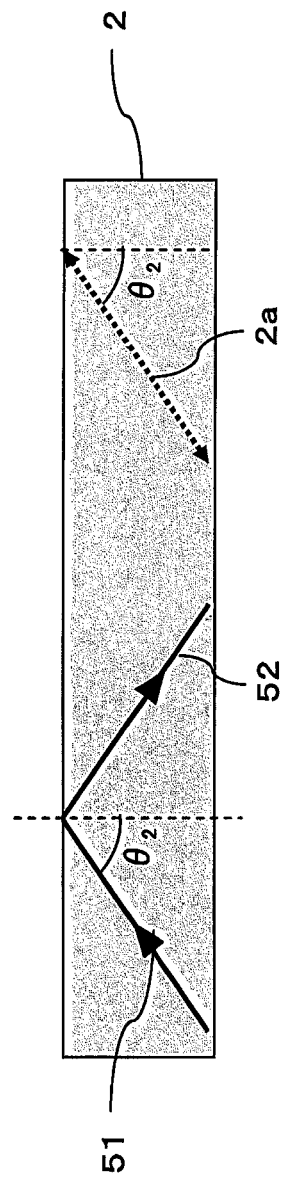

In general, $n_2 > n_1$; thus, as illustrated in FIG. 7B, when the inclination $\theta_2$ of the absorption axis of the second polarizer from the normal line direction of the film plane becomes large, $\sin \theta_1$ becomes more than one. In such a case, $\theta_1$ satisfying the equation (1) does not exist. In other words, the light rays 51 transmitted in the direction parallel to the absorption axis 2a are wholly reflected on the interface of the second polarizer to turn into reflected light rays 52 without being emitted to the viewing side, that is, the rays 51 undergo the so-called total reflection. When the total reflection is caused, light rays "in the main transmission direction", which give a maximum transmittance, are not emitted to the viewing side so that the light-using efficiency of the display device tends to lower.

In order not to cause the total reflection, it is necessary that the inclined angle $\theta_2$ of the absorption axis of the second polarizer is smaller than the critical angle $\theta_M$ for the total reflection. The critical angle can be represented by the following formula (3) or (4):

$$\sin \theta_M = n_1/n_2 \qquad (3)$$

$$\theta_M = \sin^{-1}(n_1/n_2) \qquad (4)$$

For example, when the viewing side material is air ($n_1=1$) and the refractive index $n_2$ of the second polarizer is 1.5, it is necessary that the inclined angle $\theta_2$ of the absorption axis of the second polarizer is smaller than $\sin^{-1}(1/1.5)$, which is the critical angle $\theta_M$ and is nearly equal to 42°. In other words, when the refractive index of the second polarizer is 1.5, only light rays having an angle $\theta_2$ in the range of ±about 42°, out of light rays emitted from the second polarizer, are emitted to the viewing side by reflection; therefore, when the angle $\theta_2$ is larger than this range, the main transmission direction $\theta_1$, which corresponds to FIG. 7d, does not exist.

When the refractive index of the material constituting the second polarizer is larger than 1.5, the critical angle $\theta_M$ is a value smaller than 42°. Contrarily, when the refractive index of the material constituting the second polarizer is smaller than 1.5, the critical angle $\theta_M$ is a value larger than 42°.

As described above, the critical angle $\theta_M$ is varied in accordance with the refractive index of the second polarizer. Additionally, the second polarizer has birefringence and further absorbs light. For this reason, the definition of the refractive index becomes more complicated. It is therefore difficult to specify a preferred range of the inclination $\theta_2$ of the absorption axis of the second polarizer from the normal line direction of the film plane without reservation. However, it is sufficient for practical use that the angle $\theta_2$ is in the range from 0 to 45°.

However, when the polar angle $\theta_1$ of the viewing direction becomes large, the surface reflection increases as represented by the following formulae (5) and (6):

$$R_s = (\sin(\theta_1 - \theta_2)/\sin(\theta_1 + \theta_2))^2 \qquad (5)$$

$$R_p = (\tan(\theta_1 - \theta_2)/\tan(\theta_1 + \theta_2))^2 \qquad (6)$$

In particular, the reflectance $R_s$ of S polarized light, which becomes transmitted light, remarkably increases as compared with the reflectance $R_p$ of P polarized light.

Furthermore, when the polar angle of the viewing angle becomes extremely large, the optical path length of light transmitted in the polarizer becomes large so that the polarizer largely absorbs the light, as well as the surface reflection increases as described above. From this viewpoint, the angle $\theta_2$ is preferably from 0 to 40°, more preferably from 0 to 30°.

Figure 8:
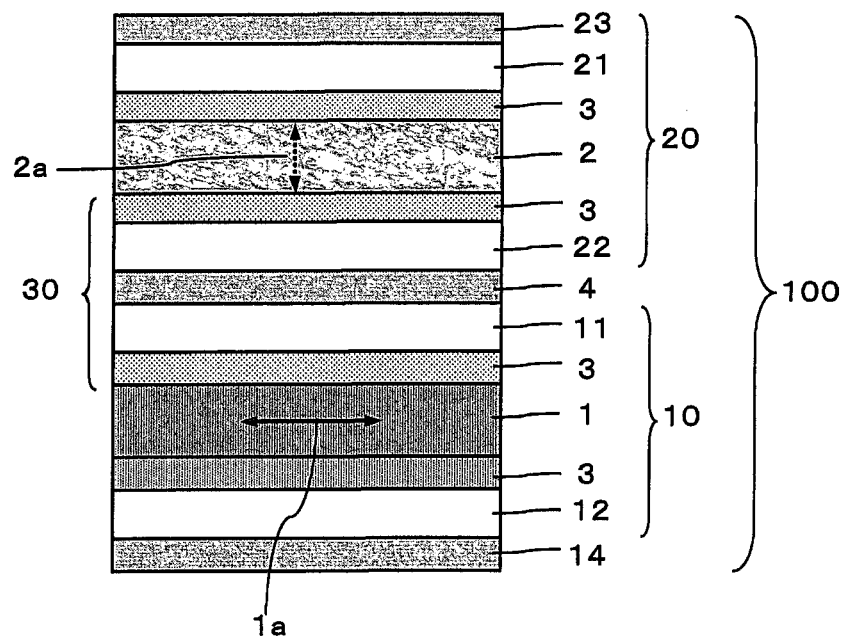
FIG. 8 is a sectional view schematically illustrating an example of the structure of the viewing angle controlling system of the invention.

As illustrated in FIG. 1, the viewing angle controlling system of the invention may have the medium 30 between the first polarizer 1 and the second polarizer 2 used in the system. As illustrated in FIG. 8, the medium 30 may include such as protective films 11 and 22 for the polarizers, adhesive layers 3, and a pressure-sensitive adhesive layer 4 for causing these films to adhere onto each other.

Incidentally, in the viewing angle controlling system of the invention, viewing-angle-control is made possible by the matter that the angular relationship between the apparent absorption axes of the first polarizer and the second polarizer is varied as described above. Accordingly, in some cases, a desired viewing-angle-control effect may not be obtained when the polarization state is varied by the medium between the first polarizer and the second polarizer. From this viewpoint, it is preferred that the medium between the first polarizer and the second polarizer does not have a property of causing a substantial change of the polarization state of light in the normal line direction of the film plane of the second polarizer.

In order that the polarization state is not substantially changed in the film normal line direction, that is, in the direction along which the system is viewed from the front, it is preferred that the medium between the first polarizer and the second polarizer does not substantially have in-plane retardation. Here, the wording "does not substantially have an in-plane retardation" denotes that the in-plane retardation Re is 40 nm or less. The in-plane retardation Re is preferably 20 nm or less, more preferably 10 nm or less, even more preferably 5 nm or less.

Further, even when the medium between the first polarizer and the second polarizer has an in-plane retardation, it is preferred that the direction in which the refractive index of the medium is maximum, that is, the slow axis direction of the medium is parallel or perpendicular to the absorption axis of the first polarizer. Here, the wording "parallel or perpendicular" does not need to be strictly parallel or perpendicular to each other, and the angle also includes in the range of 0°±5° or 90°±5°. The angle range is preferably 0°±3° or 90°±3°, more preferably 0°±1° or 90°±1°. Even when the medium between the first polarizer and the second polarizer does not have substantially an in-plane retardation, it is preferred that the angle made between the slow axis direction of the medium and the absorption axis of the first polarizer is in the above range from the viewpoint of making the change of the polarization state smallest when the system is viewed from the front.

Further, for the purpose of obtaining a desired viewing-angle-control effect even in oblique directions also, it is preferred that the thickness-direction retardation Rth of the medium between the first polarizer and the second polarizer is small. Specifically, the thickness-direction retardation Rth is preferably 60 nm or less, more preferably 40 nm or less, even more preferably 30 nm or less.

Here, the in-plane retardation Re, the thickness-direction retardation Rth, and NZ, which will be described later, are defined by the following equations:

$$Re = (nx - ny)d,$$

$$Rth = (nx - nz)d, \text{ and}$$

$$NZ = Rth/Re = (nx - nz)/(nx - ny)$$

wherein the refractive index in the in-plane slow axis direction of the medium is represented by nx, the refractive index in the in-plane fast axis direction is represented by ny, the refractive index in the thickness direction is represented by nz, and the thickness of the film is represented by d.

As described above, it is preferred that the slow axis direction of the medium between the first polarizer and the second polarizer is parallel or perpendicular to the absorption axis of the first polarizer, however, when taking, in particular, the effect of retardation at an oblique viewing angle into account, it is preferred that a changed direction of the apparent slow axis of the medium between the first polarizer and the second polarizer which accompanies a change of the viewing direction is consistent with a changed direction of the apparent absorption axis of the first polarizer. It is because when the two changed directions are consistent with each other, the effect of the retardation of the medium onto viewing-angle-control becomes small. The changed direction of the slow axis of the medium between the first polarizer and the second polarizer is defined by the NZ of the medium. In the case of an ordinary O type polarizer, the change of the apparent absorption axis which accompanies a change of the viewing direction is equal to the change of the apparent slow axis of a retardation film in which the NZ is 1. From this viewpoint, it is preferred that the NZ of the medium between the first polarizer and the second polarizer is close to 1.

Further, when the NZ of the medium between the first polarizer and the second polarizer is 0.5, the apparent slow axis direction of the medium is not changed in accordance with the viewing direction. When the NZ of the medium between the first polarizer and the second polarizer is smaller than 0.5, the changed direction of the apparent slow axis of the medium at an oblique viewing angle is opposite to that in the case where NZ=1. Accordingly, when the NZ of the medium is larger than 0.5, it is preferred that the slow axis direction of the medium is parallel to the absorption axis direction of the first polarizer. When the NZ is smaller than 0.5, it is preferred that they are perpendicular to each other. Further, when the NZ is 0.5, the slow axis is substantially unchanged. Thus, they may be parallel or perpendicular to each other.

As illustrated in FIG. 8, the medium between the first polarizer and the second polarizer may contain such as a plurality of films, pressure-sensitive adhesive layers and adhesive layers. Even if each of these films and the like in such a case does not satisfy the above optical characteristics, it may be sufficient that a product in which a plurality of these films are combined with each other is regarded as the medium 30 and this product satisfies the optical characteristics. When described by way of a typical example, in FIG. 8, an example is included in which a film having property of Re=0 nm and Rth=+100 nm (so-called negative C plates) is used as a protective film 11 for the first polarizer 1, a film having property of Re=0 nm and Rth=−100 nm (so-called positive C plates) is used as a protective film 22 for the second polarizer 2, and these films are caused to adhere onto each other through the pressure-sensitive adhesive layer 4 and/or the adhesive layers 3 having no birefringence. In this example, each of the films is a film in which the absolute value of the Rth is more than 60 nm; thus, it is difficult to state that each of the films in the medium has optical isotropy. However, the medium, wherein these films are laminated on each other, is an optically isotropic medium in which Re=0 nm and Rth=0 nm; thus, the medium can be preferably used.

(Protective Film(s))

The first polarizer and the second polarizer used in the viewing angle controlling system of the invention may be each used as a polarizing plate in the state that a protective film is caused to adhere appropriately onto either or each of both surfaces of the polarizer. In particular, as for the polarizer that is made of an iodine-based polarizer or a liquid crystal material, it is preferred that the polarizer has, on each of both surfaces thereof, a protective film from the viewpoint of preventing the sublimation of the dichroic material or ensuring the film strength.

A thermoplastic resin with a high level of transparency, mechanical strength, thermal stability, moisture blocking properties, isotropy, and the like may be used as a material for forming the protective film. Examples of such a thermoplastic resin include polycarbonate based resins, polyvinyl alcohol based resins, cellulose based resins, polyester based resins, polyarylate based resins, polyimide based resins, cyclic olefin polymer based resins, polysulfone based resins, polyethersulfone based resins, polyolefin based resins, polystyrene based resins, and any mixture thereof. Also, thermosetting resins or ultraviolet curing resins such as urethane, acrylic urethane, epoxy, or silicone resins may be used. The protective film may also contain at least one type of any appropriate additive. Examples of the additive include an ultraviolet absorbing agent, an anti-oxidant, a lubricant, a plasticizer, a release agent, an anti-discoloration agent, a flame retardant, a nucleating agent, an anti-static agent, a pigment, and a colorant. The content of the thermoplastic resin in the protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

As explained above, the protective film as a medium between the first polarizer and the second polarizer preferably has optical isotropy. From such a viewpoint, cellulose based resins are generally used as a material for the protective film. An ester of cellulose and a fatty acid is preferable as the cellulose based resin. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose based resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluene-sulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid based cellulose resin.

Further, the protective film to be used may also be a polymer film containing a resin composition containing a thermoplastic resin having a substituted and/or unsubstituted imide group in the side chain and a thermoplastic resin having a substituted and/or unsubstituted phenyl and nitrile groups in the side chain as disclosed in JP-A-2001-343529 (WO01/37007); a polymer film containing a lactone ring structure-containing (meth)acryl-based resin as disclosed in JP-A Nos. 2000-230016, 2001-151814, 2002-120326, 2002-254544, 2005-146084, and 2006-171464; a polymer film containing an acrylic resin having an alkyl unsaturated carboxylate structure unit and a glutaric anhydride structure unit as disclosed in JP-A-2004-70290, JP-A-2004-70296, JP-A-2004-163924, JP-A-2004-292812, JP-A-2005-314534, JP-A-2006-131898, JP-A-2006-206881, JP-A-2006-265532, JP-A-2006-283013, JP-A-2006-299005, and JP-A-2006-335902; a film containing a thermoplastic resin having a glutarimide structure as disclosed in JP-A Nos. 2006-309033, 2006-317560, 2006-328329, 2006-328334, 2006-337491, 2006-337492, 2006-337493, and 2006-337569 or the like. These films are preferred, because they have low retardation and low photoelastic coefficient so that they can avoid defects such as unevenness caused by polarizing plate distortion and because they have low moisture permeability so that they can highly resistant to moisture.

The cyclic polyolefin based resin is also preferably used for protective film having optically isotropy. In particular, a norbornene based resin is preferably used. Cyclic olefin based resin is a generic name for resins produced by polymerization of cyclic olefin used as a polymerizable unit, and examples thereof include the resins disclosed in JP-A-01-240517, JP-A-03-14882, and JP-A-03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The thickness of the protective film is appropriately determined, and is generally from about 1 to about 500 µm in view of strength, workability such as handleability, thin layer-forming properties, or the like. In particular, it is preferably from 1 to 300 µm, and more preferably from 5 to 200 µm. If the thickness of the protective film is too small, a problem such as defects of local irregularities (knick defects) may be caused.

The protective films on both surfaces of the polarizer may be the same or different. Further, a laminate made of two or more layers may be used onto one of both surfaces of the polarizer.

The method for laminating the protective film onto the first or second polarizer, and the method for laminating polarizing plates in which the protective film is laminated on the polarizer are not particularly limited. From the viewpoint of workability or light-using efficiency, it is desired that an adhesive agent or a pressure-sensitive adhesive agent is used to laminate each of the layers without putting air therebetween. In the case of using the adhesive agent or the pressure-sensitive adhesive agent, the kind thereof is not particularly limited, and various agents may be used. In this case, it is desired that the adhesive agent or the pressure-sensitive adhesive agent is transparent, does not absorb light in the visible wavelength range, and has a refractive index as close to that of each of the layers as possible from the viewpoint of suppressing surface reflection. From such a viewpoint, for example, an acryl-based pressure-sensitive adhesive agent or a water-based adhesive agent is preferably used. Examples of the water-based adhesive agent include such as isocyanate based adhesive agents, polyvinyl alcohol based adhesive agents, gelatin based adhesive agents, vinyl based latex adhesive agents, and water based polyester adhesive agents. Further, a diffusion pressure-sensitive adhesive layer may also be used, which is obtained by incorporating particles having a different refractive index into a pressure-sensitive adhesive agent.

In addition, ultraviolet absorbing property may be given to the above-mentioned protective layer, adhesive layer, and pressure-sensitive adhesive layer etc., using a method of adding UV absorbents, such as salicylic acid ester type compounds, benzophenol type compounds, benzotriazol type compounds, cyano acrylate type compounds, and nickel complex salt type compounds.

Proper method may be carried out to attach a pressure-sensitive adhesive layer or adhesive layer to one side or both sides of the film. As an example, about 10 to about 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on the film using suitable developing methods, such as flow method and coating method, or a method in which a pressure-sensitive adhesive layer is once formed on a separator, as mentioned above, and is then transferred on a film may be mentioned.

A pressure-sensitive adhesive layer or an adhesive layer may also be prepared on one side or both sides of a film as a layer in which pressure-sensitive adhesives with different composition or different kind etc. are laminated together. Moreover, when pressure-sensitive adhesive layers or adhesive layers are prepared on both sides, layers that have different compositions, different kinds or thickness, etc. may also be used on front side and backside of the film.

The protective film may be subjected to surface modification treatment before it is applied with the adhesive or pressure-sensitive adhesive. Specific examples of such treatment include corona treatment, plasma treatment, primer treatment, saponification treatment, and coupling agent treatment.

A hard coat layer may be prepared, or anti-reflection processing, processing aiming at sticking prevention, diffusion or anti-glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Anti-reflection processing is applied for the purpose of anti-reflection of outdoor daylight on the surface of a polarizing plate and it may be prepared by forming an anti-reflection film according to the conventional method etc. Besides, a sticking prevention processing is applied for the purpose of adherence prevention with adjoining layer.

In addition, an anti-glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 20 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 70 parts by weight to the transparent resin 100 parts by weight that forms the fine concavo-convex structure on the surface, and preferably 5 to 50 parts by weight.

In addition, the above-mentioned anti-reflection layer, sticking prevention layer, diffusion layer, anti-glare layer, etc. may be built in the protective film itself, and also they may be prepared as an optical layer different from the protective film.

As illustrated in FIG. 8, in the viewing angle controlling system of the invention, it is particularly preferred to provide the surface treating layer 23 on the protective film 21 opposite to the first-polarizer principle surface of the second polarizer 2.

Moreover, in the viewing angle controlling system of the invention, as illustrated in FIG. 8, the pressure-sensitive adhesive layer 4 may be provided over the first-polarizer-side principle surface for the purpose of causing the system to adhere onto an image display device.

A temporary separator may be attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

Figure 9:
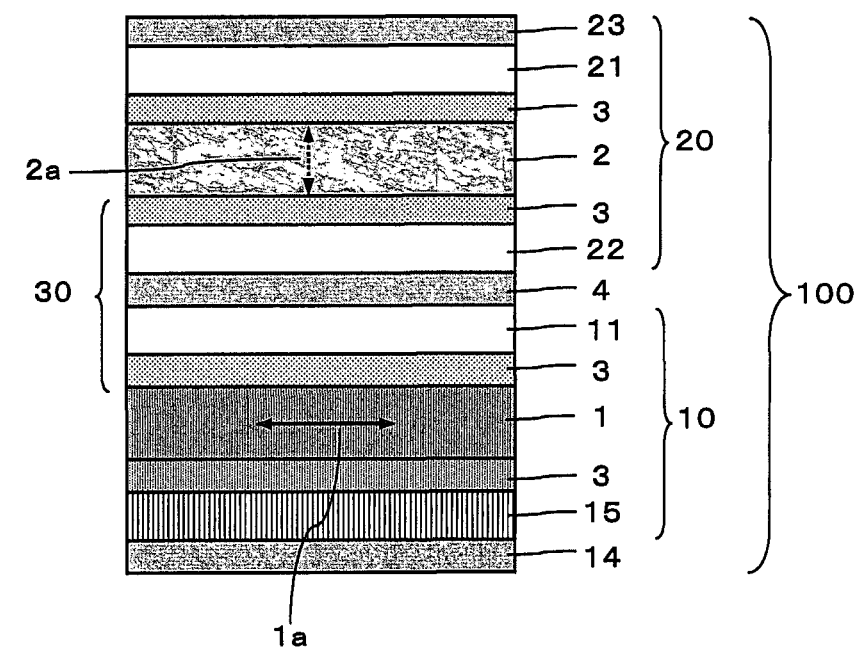
FIG. 9 is a sectional view schematically illustrating an example of the structure of the viewing angle controlling system of the invention.
Figure 10:
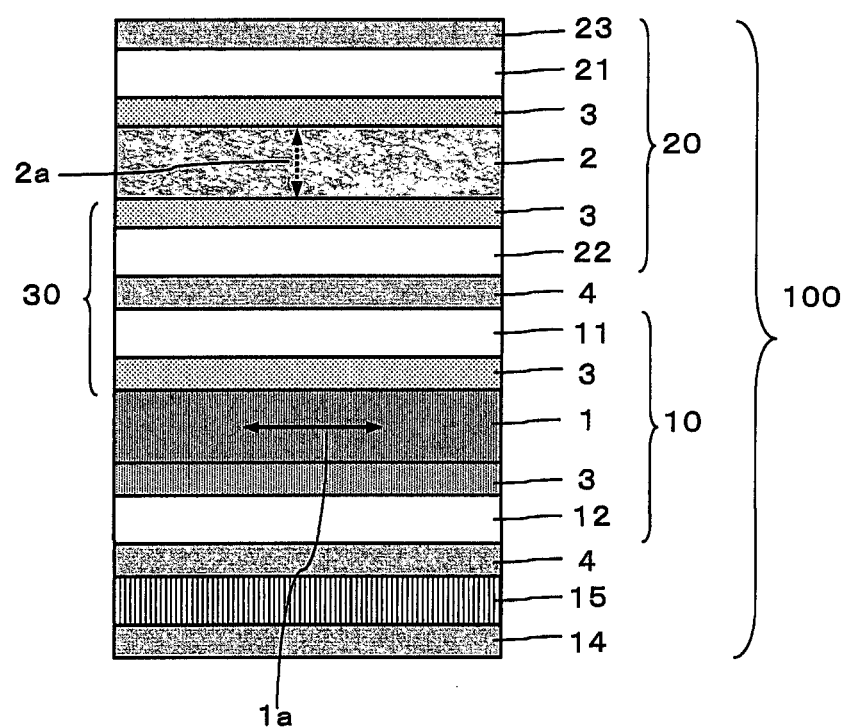
FIG. 10 is a sectional view schematically illustrating an example of the structure of the viewing angle controlling system of the invention.

Furthermore, as illustrated in FIG. 9, an optical compensation film 15, such as a retardation film or a viewing angle compensation film, may also be provided as a protective film instead of the protective film 12 in FIG. 8. Further, as illustrated in FIG. 10, the optical compensation film 15 may be caused to adhere onto the protective film 12 by use of another pressure-sensitive adhesive layer 4 or the like. In the viewing angle controlling system which is used particularly in a liquid crystal display for a mobile purpose, which is desired to be made thin and light, it is preferred to provide, as the protective film, the optical compensation film 15, such as a retardation film or a viewing angle compensation film.

A film produced by uniaxially or biaxially stretching any of various polymer materials or bonded to an oriented liquid crystal polymer film or an oriented liquid crystal polymer layer supported on a film may be used as the retardation film mentioned above. The thickness of the retardation film is generally, but not limited to, from about 20 to about 150 μm.

Examples of the polymer material preferably used for the retardation film are same to the material used for the protective films as mentioned above. Any of these polymer materials may be formed into an oriented product (a stretched film) by casting and stretching or the like. Further, an oriented liquid crystal polymer layer supported on a film may be preferably used.

Examples of the liquid crystal polymer include various main-chain or side-chain types having a liquid crystal molecular orientation property-imparting conjugated linear atomic group (mesogen) introduced in a main-chain or side-chain of a polymer. Examples of the main-chain type liquid crystal polymer include polymers having a mesogen group bonded thereto via a flexibility-imparting spacer moiety, such as nematically ordered polyester type liquid-crystal polymers, discotic polymers, and cholesteric polymers. For example, the side-chain type liquid crystal polymer may be a polymer comprising: a main-chain skeleton of polysiloxane, polyacrylate, polymethacrylate, or polymalonate; and a side-chain having a mesogen moiety that comprises a nematic orientation-imparting para-substituted cyclic compound unit and is bonded thereto via a spacer moiety comprising a conjugated atomic group. For example, any of these liquid crystal polymers may be applied by a process that includes spreading a solution of the liquid crystalline polymer on an alignment surface such as a rubbed surface of a thin film of polyimide, polyvinyl alcohol or the like, formed on the glass plate, and an obliquely vapor-deposited silicon oxide surface, and heat-treating it.

The retardation film may have any appropriate retardation depending on the intended use such as compensation for coloration, viewing angle, or the like due to the birefringence of various wave plates or liquid crystal layers. Two or more types of retardation films may also be laminated to provide controlled optical properties, including retardation.

A retardation film satisfying the relation: $nx=ny>nz$, $nx>ny>nz$, $nx>ny=nz$, $nx>nz>ny$, $nz=nx>ny$, $nz>nx>ny$, or $nz>nx=ny$ may be selected and used depending on various applications. The relation $ny=nz$ includes not only the case where $ny$ is completely equal to $nz$ but also the case where $ny$ is substantially equal to $nz$.

For example, the retardation film satisfying the relation $nx>ny>nz$ to be used preferably has a in-plane retardation of 40 to 100 nm, a thickness retardation of 100 to 320 nm, and an Nz coefficient of 1.8 to 4.5. For example, the retardation film satisfying the relation $nx>ny=nz$ (positive A plate) to be used preferably has an in-plane retardation of 100 to 200 nm. For example, the retardation film satisfying the relation $nz=nx>ny$ (negative A plate) to be used preferably has an in-plane retardation of 100 to 200 nm. For example, the retardation film satisfying the relation $nx>nz>ny$ to be used preferably has an in-plane retardation of 150 to 300 nm and an Nz coefficient of more than 0 and not more than 0.7. As described above, for example, the retardation film satisfying the relation $nx=ny>nz$, $nz>nx>ny$ or $nz>nx=ny$ may also be used. The person skilled in the art can choose any appropriate retardation film which is suitable for the liquid crystal display used.

A preferable range of retardation value of the protective film may be appropriately determined depending on the liquid crystal display to be produced therewith. In the case of VA (Vertical Alignment, including MVA and PVA) mode LCD, it is preferred that the protective film on at least one side of the polarizing plate (on the cell side) has a retardation. Specifically, it preferably has a retardation Re in the range of 0 to 240 nm and a retardation Rth in the range of 0 to 500 nm. In terms of three-dimensional refractive index, the case of nx>ny=nz, nx>ny>nz, nx>nz>ny, or nx=ny>nz (uniaxial, biaxial, Z conversion, negative C-plate) is preferred. When polarizing plates are used on upper and lower sides of a liquid crystal cell, the protective films may have a retardation on upper and lower sides of the liquid crystal cell, or one of the upper and lower protective films may has a retardation.

The viewing angle compensation film mentioned above is a film for extending viewing angle so that a picture may look comparatively clearly, even when it is viewed from an oblique direction not from vertical direction to a screen. As such a viewing angle compensation retardation film, in addition, a film having birefringence property that is processed by uniaxial stretching or orthogonal biaxial stretching and a biaxial stretched film as inclined alignment film etc. may be used. As inclined alignment film, for example, a film obtained using a method in which a heat shrinking film is adhered to a polymer film, and then the combined film is heated and stretched or shrunk under a condition of being influenced by a shrinking force, or a film that is aligned in oblique direction may be mentioned.

Besides, a compensation film in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

Here, the "viewing angle compensation film" referred to herein is a film for restraining a change in the quality of an image which accompanies a change in the viewing direction, and mainly makes use of a birefringent phenomenon so that the viewing angle controlling principle thereof is different from the viewing angle controlling system of the invention in which the quantity of light is restrained. For this reason, the viewing angle compensation film does not hinder the function of the viewing angle controlling system of the invention.

An image display device in which the viewing angle of which is controlled can be produced by arranging the viewing angle controlling system of the invention on at least one principle surface of a display panel. The display panel is not particularly limited. Thus, the panel may be any one of a display panel using an external light source, such as a liquid crystal display (LCD) panel; and a selfluminous-type display panel, such as an EL display (ELD) panel, a plasma display panel (PDP), or a cathode ray tube (CRT). In the case of the LCD, it is preferred from the viewpoint of viewing-angle-control to arrange the viewing angle controlling system of the invention over at least one of the viewing-side principle surface and the light-source-side principle surface of the liquid crystal cell. In the case of a selfluminous-type display device, it is preferred to arrange the viewing angle controlling system of the invention over the viewing-side principle surface of the display panel.

As described above, the viewing angle is controlled in the direction perpendicular to the absorption axis of the first polarizer in the viewing angle controlling system in the image display device of the invention. When the absorption axis of the first polarizer in the viewing angle controlling system of the invention is arranged, for example, in the horizontal direction of the screen, the viewing angle in the vertical direction can be controlled. When the absorption axis is arranged in the vertical direction of the screen, the viewing angle in the horizontal direction can be controlled. The selection of the viewing angle controlling direction is attained based on the usage of the display device. When the display is, for example, an image display device fitted to a dashboard of a car, such as a car navigation system, it is desired to restrict the viewing angle in the vertical direction from the viewpoint of restraining the projection of an image on the system onto the front window. It is therefore preferred to arrange the absorption axis of the first polarizer such that it is consistent with the horizontal direction (right and left direction) of the screen.

Further, when the image display device is an ATM, it is desired to restrict the viewing angle in the horizontal direction in order to prevent any other person's peep. It is therefore preferred to arrange the absorption axis of the first polarizer such that it is consistent with the vertical direction (upper and lower direction) of the screen. Furthermore, in the case of the ATM, it is desired in some cases to restrict the viewing angle from the above on the supposition that information may be read out through a hidden camera set in the above as well as the information may be peeped from right or left. On the other hand, it is desired that image information can be read out from the below in order that a user who is forced to view the screen from the below, such as a person in a wheelchair, can use the ATM. In such a case, the image display device can be obtained in which good viewability from the below is exhibited and the viewing angle from the above is restricted by use of the viewing angle controlling system in which the absorption axis of the second polarizer is inclined from the normal line direction of the film plane.

In the image display device of the invention, the first polarizer of the viewing angle controlling system may be a polarizer having a function of a polarizer formed for the display of the display panel or for giving an anti-reflective function. It is advantageous that this structure can make costs lower, in addition to making the number of members reduced and making the thickness or weight of the image display device decreased, as compared with the structure in which the two are separately formed. Furthermore, a light loss based on the absorption of light can be restrained so that it is advantageous in terms of the brightness of the screen. For these reasons, the structure is suitable for a mobile display or a display adapted for car, which is required to be made as small as possible in weight and thickness and to be made low in power consumption.

Further, the image display device of the invention may have a structure in which the viewing angle controlling system and the display panel are adhered and integrated with each other, or they are arranged at separated positions. Further, only the first polarizer of the viewing angle controlling system may be adhered and integrated to the display panel and the second polarizer is arranged at a different position. In the structure in which the viewing angle controlling system and the display panel are arranged at separated positions, the viewing angle controlling system may be used in the state that the system is adhered onto another transparent film or a substrate.

From the viewpoint of restraining image ununiformity generated by such as unevenness which accompanies the contraction of the film, it is preferred that the first polarizer and the second polarizer of the viewing angle controlling system are adhered and integrated with each other and furthermore the viewing angle controlling system and the display panel are adhered and integrated with each other. On the other hand, by arranging at different positions, the viewing angle controlling system can be put to and taken from the panel. Thus, viewing-angle-control can be attained by use of the viewing angle controlling system only when needed.

The image display device of the invention may be a display device in which at least one principle surface of the display panel has a transparent plate and the transparent plate, wherein the viewing angle controlling system are adhered and integrated with each other with an adhesive or a pressure-sensitive adhesive layer interposed therebetween. Further, the viewing angle controlling system adhered and integrated with a transparent plate may be furthermore adhered and integrated with a display panel.

As the transparent plate, such as a transparent film, a sheet, or the like can be used. The plate 304 may be, for example, a transparent plate that also has a function of a display-protecting plate or a touch screen as a front plate of the image display device. Further, in such a structure, the viewing angle controlling system 100 may be adhered on a principle surface of any side of the front plate 304, however, from the viewpoint of preventing such as scratches in the system, it is preferred to arrange the viewing angle controlling system 100 between the front plate 304 and the display panel 300 as shown in FIG. 12.

As an example of a non-selfluminous-type display out of the image display devices of the invention, an embodiment in which the display device is a liquid crystal display (LCD) will be described. As described above, in the LCD, it is preferred to arrange the viewing angle controlling system of the invention over any one of the viewing-side principle surface and the light-source-side principle surface of the liquid crystal cell. Incidentally, the liquid crystal panel has various materials, such as a TFT material, a color filter, and an anti-glare layer, and light is refracted, reflected, diffused or scattered on the interface of the materials so that the transmission direction of the light is easily changed in the display panel. Therefore, when the viewing angle controlling system is arranged over the light-source-side (opposite to the viewing side) principle surface, the viewing angle controlling effect tends to be smaller than in the case where the system is arranged on the viewing-side principle surface. From such a viewpoint, as illustrated in FIG. 11, it is preferred that a viewing angle controlling system 100 is arranged on the viewing-side principle surface of a display panel (liquid crystal cell) 300 in order to carry out the viewing angle controlling more effectively.

Figure 13:
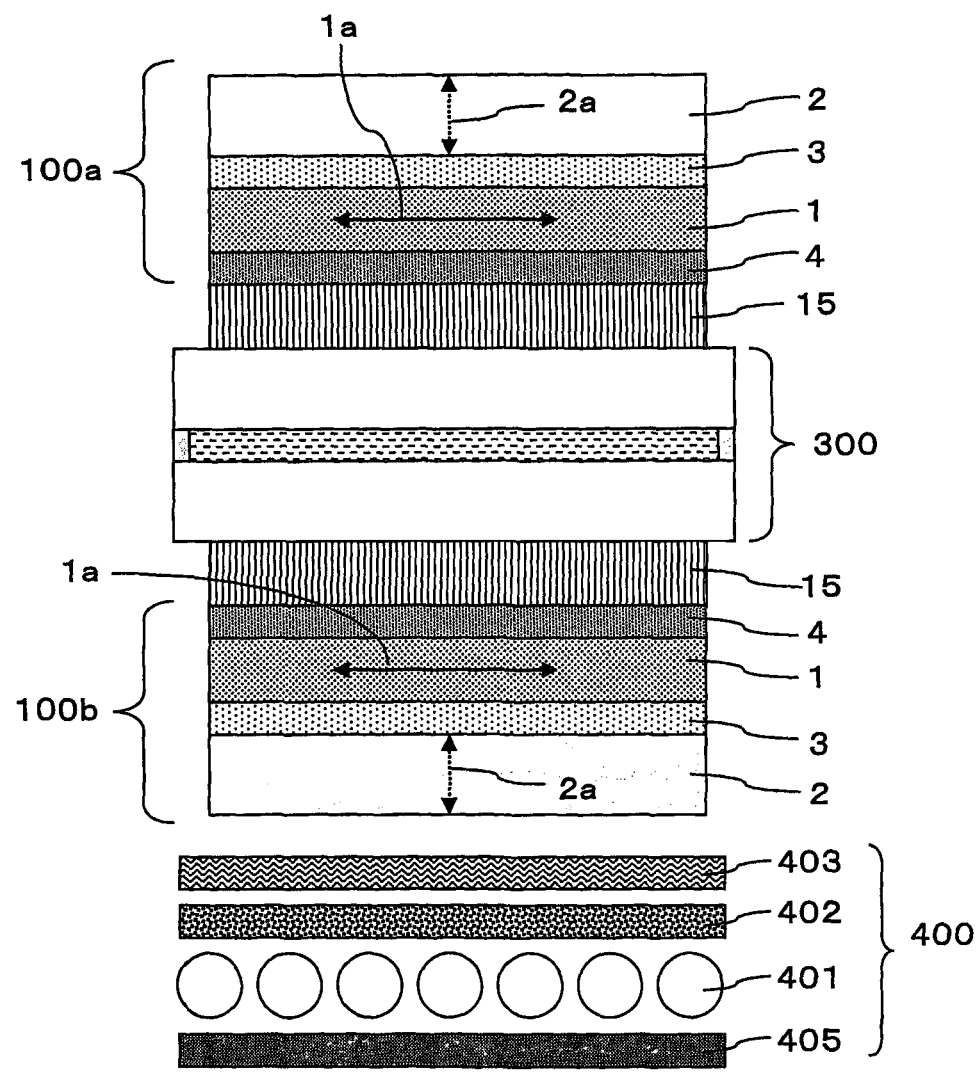
FIG. 13 is a sectional view schematically illustrating an example of a liquid crystal display that is an embodiment of the image display device of the invention.

Further, as illustrated in FIG. 13, viewing angle controlling systems 100a and 100b may be provided on both principle surfaces of the display panel (liquid crystal cell) 300. Here, in FIG. 13, first polarizers of the systems 100a and 100b are illustrated in such a manner that the absorption axis directions of the first polarizers 1 are parallel to each other. When the two polarizers are arranged in parallel to each other in this way, control can be attained so as to make a change in the viewing-angle-control property in the viewing angle controlling direction, that is, in the direction perpendicular to the absorption axis direction 1a of the first polarizer 1. On the other hand, when the absorption axis directions of the first polarizers 1 of the systems 100a and 100b are made perpendicular to each other, the viewing angles in the vertical and horizontal directions can be simultaneously controlled.

Figure 11:
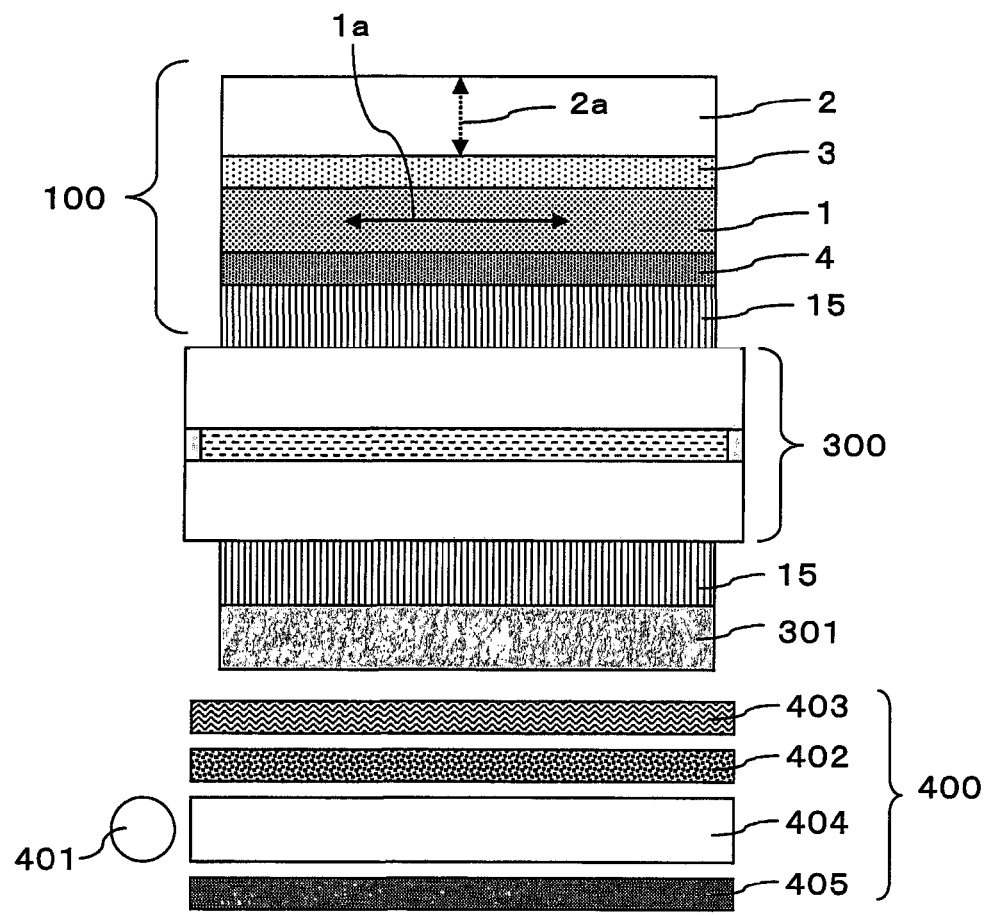
FIG. 11 is a sectional view schematically illustrating an example of a liquid crystal display that is an embodiment of the image display device of the invention.
Figure 12:
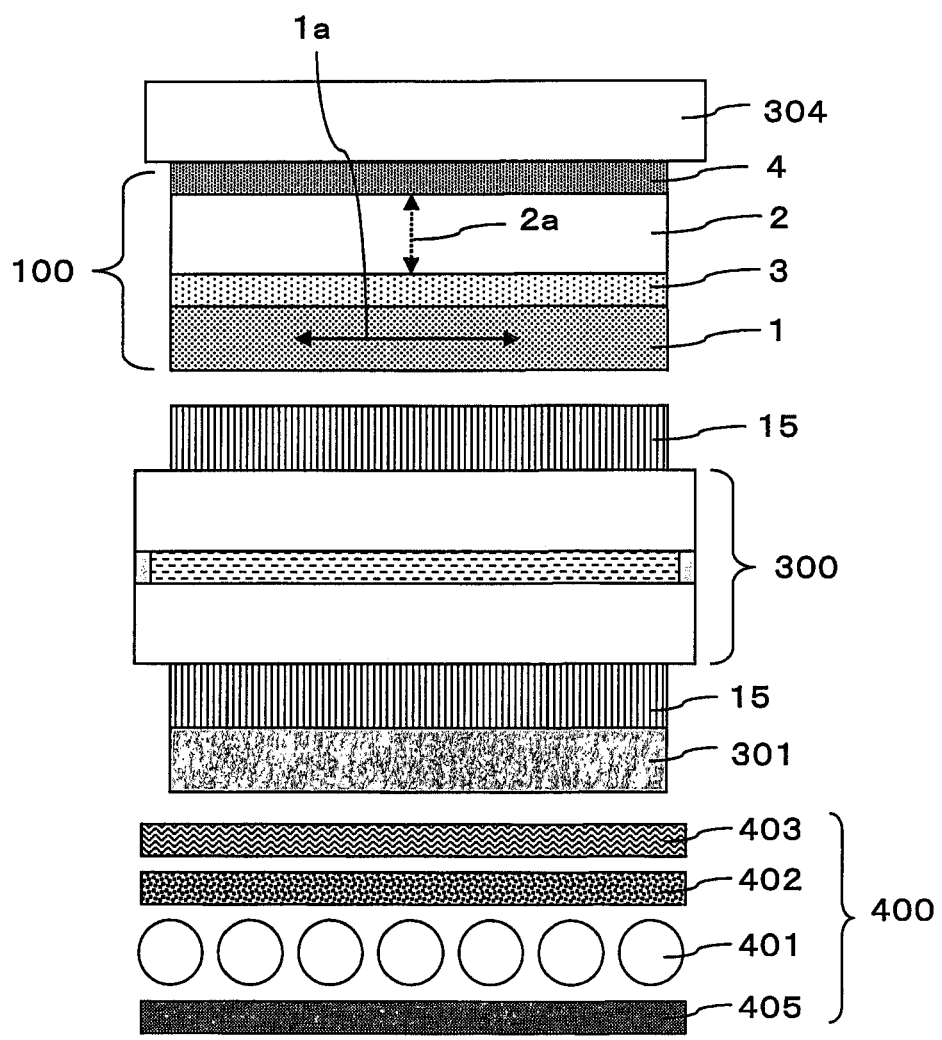
FIG. 12 is a sectional view schematically illustrating an example of a liquid crystal display that is an embodiment of the image display device of the invention.

As described above, in order that the first polarizer 1 of the viewing angle controlling system 100 has a function as a polarizer of a liquid crystal panel, it is preferred that in the viewing angle controlling system, the first-polarizer-side principle surface is arranged to be the liquid crystal cell 300 side, as illustrated in FIGS. 11, 12 and 13.

A liquid crystal display may be formed in accordance with a conventional method. Specifically, the liquid crystal display is generally formed by fabricating a liquid crystal cell, a polarizer or an optical film, and optional constituting members such as a light source, appropriately and incorporating a driving circuit into the workpiece, or the like.

The kind of the liquid crystal cell 300 is not particularly limited, and may be used various liquid crystal cells such as twisted nematic (TN) mode, super twisted nematic (STN) mode, electrically controlled birefringence (ECB) mode, vertical alignment (VA) mode, in-plane switching (IPS) mode, fringe field switching (FFS) mode, optically compensated bend (OCB) mode, hybrid aligned nematic (HAN) mode, surface stabilized ferroelectric liquid crystal (SSFLC) mode, anti-ferroelectric liquid crystal (AFLC) mode liquid crystal cells. It is particularly preferred to use a VA mode or an IPS mode liquid crystal cell in which the absorption axis of a polarizer for a display is generally arranged in parallel to or perpendicularly to the horizontal direction of a screen in the image display device of the invention, in order to control the viewing angle in the vertical or horizontal direction ordinarily.

The light source may be a sidelight type backlight as illustrated in, for example, FIG. 11 in which a light source 401 arranged near a side and a light guide plate 404 are used; a direct backlight as illustrated in FIG. 12 in which a light source 401 is arranged just below the liquid crystal cell 300; a surface light source or the like. Furthermore, the backlight may have a prism sheet 402, a diffusing plate 403, a reflecting plate 405, and on the like. The prism sheet is a sheet which condenses light rays emitted to any one of the vertical direction and the horizontal direction based on the shape thereof, thereby improving the brightness in a predetermined direction. Since light rays are condensed into the predetermined direction, the brightness in the other directions is contrarily lowered so that the viewing angle in the directions becomes narrow. However, in the image display device of the invention, by making the directions in which the brightness is decreased by the prism sheet is substantially consistent with the direction in which the viewing angle is controlled through the viewing angle controlling system, the viewing angle can be more effectively controlled while the brightness in the main transmission direction is improved.

Further, when the liquid crystal display is formed, an appropriate member, such as an anti-reflective film, a protective plate, a lens sheet or a light scattering plate, may be arranged to an appropriate position in the form of one or two or more layers besides the above members.

Furthermore, a member such as an optical compensation film may also be provided in the liquid crystal display of the invention. As the optical compensation film, an optical compensation film described above as that used in the viewing angle controlling system or the like is preferably used.

The following will describe in the case where a display panel is a selfluminous-type panel such as an ELD, PDP or CRT. In the selfluminous-type display, it is preferred to arrange the viewing angle controlling system on the viewing side of the display panel in order to control the viewing angle. Further, it is allowable to arrange such that any one of the first-polarizer-side principle surface and the second-polarizer-size principle surface of the viewing angle controlling system is on the display panel side.

Figure 14:
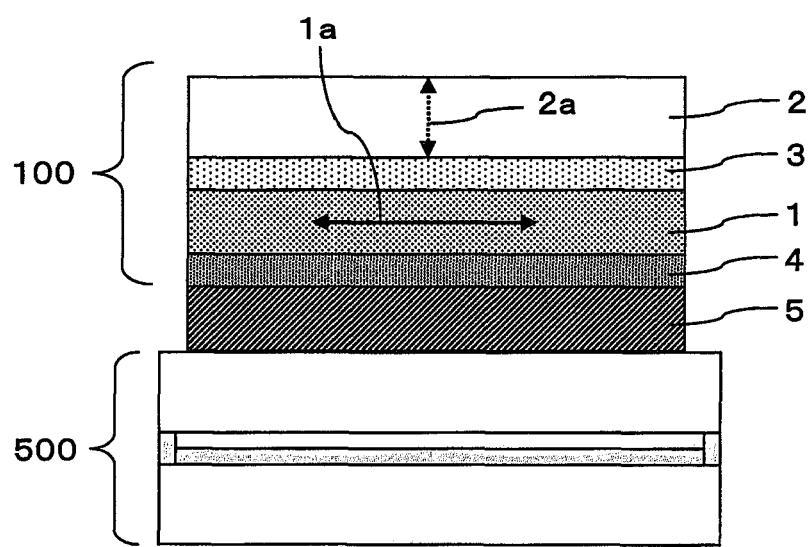
FIG. 14 is a sectional view schematically illustrating an example of an EL display device that is an embodiment of the image display device of the invention.

In particular, in the case of an ELD in which the viewability is lowered by the reflection of external light on its electrodes, or a PDP in which a light emitter causes irregular reflection, reflection can be prevented through a circular polarizer. As illustrated in FIG. 14, by arranging the first-polarizer-side principle surface to be the side of a selfluminous-type display panel 500 and providing a circularly polarizing means 5 for converting linearly polarized light to substantially circularly polarized light between the first polarizer 1 and the selfluminous-type display panel 500, the first polarizer 1 of the viewing angle controlling system can have a function of a anti-reflection polarizer of the liquid crystal panel.

Here, the wording "substantially circularly polarized light" includes not only completely circularly polarized light but also elliptically polarized light. The ellipticity thereof is preferably 0.6 or more, more preferably 0.7 or more, and even more preferably 0.8 or more. Further, the circularly polarizing means is not particularly limited as far as the means is a means for converting linearly polarized light at any one of visible wavelengths to the above substantially elliptically polarized light. The means is preferably a means for converting linearly polarized light at a wavelength of 550 nm to the above substantially elliptically polarized light.

A typical sample of the circularly polarizing means includes a means in which a retardation film having a retardation of about ¼ of visible wavelengths is arranged to set the angle made between the slow axis of the retardation film and the absorption axis of the first polarizer to be about 45° when the film is viewed along the normal line direction of the film plane. Here, "about ¼ of visible wavelengths" and the angle of "about 45°" are not particularly limited as far as conversion into the above substantially elliptically polarized light can be attained. The retardation is preferably in the range of ¼ of visible wavelengths ±30 nm, more preferably in the range of ±20 nm, and even more preferably in the range of ±10 nm. Further, the angle is preferably in the range of 45°±10°, more preferably in the range of 45°±5°, and even more preferably in the range of 45°±3°.

EXAMPLES

Hereinafter, the invention will be described by way of the examples; however, the invention is not limited to the examples.

Here, the in-plane retardation (Re) and the thickness-direction retardation (Rth) were obtained as follows:

An automatic birefringence meter (automatic birefringence meter KOBRA-21ADH, manufactured by Oji Scientific Instruments) was used to measure, at a measuring wavelength of 550 nm, the retardation from the front of the film and the retardation when the film was inclined at an angle of 40° from the slow axis as a center. From these values, the refractive indexes nx, ny and nz were calculated, which were refractive indexes in the direction which the in-plane refractive index was maximum, in the direction perpendicular thereto, and in the thickness direction of the film, respectively. From these values and the thickness (d), the in-plane retardation: (nx−ny)×d, and the thickness-direction retardation: (nx−nz)×d were obtained.

Production Example 1

To 100 parts by weight of a monofunctional thermotropic cyanobiphenyl based nematic liquid crystal monomer having a polymerizable group at a terminal thereof, 25 parts by weight of a polymeric liquid crystal (manufactured by Kurogane Kasei Co., Ltd.; copolymerization ratio n=35) represented by a chemical formula illustrated below as an additive for an improvement in vertical alignment property, 400 parts by weight of 4-methyl-2-pentanone (MIBK) as a solvent, and 5 parts by weight of a polymerization initiator (IRGACURE 907, manufactured by Ciba Geigy Corporation) were added, mixed and dissolved to prepare a liquid crystal composition solution. In addition, a dye solution was prepare in the way that 1.5 parts by weight of a polyazo based dye having an absorption peak at a wavelength of 458 nm, 0.8 parts by weight of a polyazo based dye having an absorption peak at a wavelength of 542 nm and 1 part by weight of a polyazo based dye having an absorption peak at a wavelength of 621 nm were dissolved into 100 parts by weight of cyclopentanone. The liquid crystal composition solution and the dye solution were mixed at a ratio by weight of 4:1. The mixture was coated onto a non-drawn amorphous polyolefin film (ZEONOR FILM, manufactured by Optes Inc.; thickness of 100 μm). The resultant was heated at 50° C. to evaporate the solvent. In this way, a liquid crystal monomer layer was formed. This was further heated at 80° C. to make the liquid crystal monomer layer into an isotropic state. Thereafter, the layer was naturally cooled while ultraviolet rays of 300 mJ/m² were radiated to the layer in the state that a current electric field of 1 kV was applied thereto along the normal line direction of the film plane. In this way, the liquid crystal monomer was polymerized to cure the layer completely. This process yielded a polarizer having an absorption axis in the normal line direction of the film plane. The thickness of the resultant polarizer was 3 μm. A polyvinyl alcohol based adhesive agent was used to cause a triacetylcellulose (TAC) film (Z-TAC, manufactured by Fuji Photo Film Co., Ltd.; thickness of 80 μm) to adhere onto both surfaces of this polarizer. In this way, a "polarizing plate A" was produced. Here, the in-plane retardation of the TAC film used at this time was 1 nm, and the thickness-direction retardation was 3 nm.

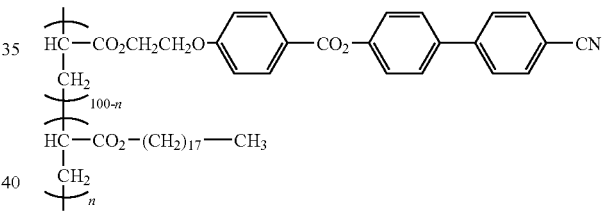

Production Example 2

The same process as in Production Example 1 was carried out except that the direction of the direct electric field applied at the time of the radiation of ultraviolet rays was inclined at an angle of 20° from the normal line direction of the film plane, so as to produce a polarizer having an absorption axis in a direction other than the directions perpendicular to and parallel to the normal line of the film plane. In the same manner as in Production Example 1, the TAC film was caused to adhere onto both surfaces of the polarizer. In this way, a "polarizing plate B" was produced.

Example 1

Formation of a Viewing Angle Controlling System

An acryl-based pressure-sensitive adhesive agent was used to cause a iodine-based polarizer (SIG 1463 DU, manufactured by Nitto Denko Corporation, hereinafter referred to as "polarizing plate C") having an absorption axis in the film plane to adhere onto one of the principle surfaces of the polarizing plate A produced in Production Example 1. In this way, a "viewing angle controlling system D" was formed.

(Formation of an Image Display Device)

The viewing-side polarizing plate of a VA mode liquid crystal display (AQUOS, manufactured by Sharp Corporation) was peeled off therefrom in which a viewing-side polarizing plate and a light-source-side polarizing plate are arranged in a cross Nicol state, the light-source-side polarizing plate has a retardation film having biaxial property (nx>ny>nz), and the viewing-side polarizing plate has no optical compensation film, and instead of this viewing-side polarizing plate, the viewing angle controlling system D was adhere onto the VA mode liquid crystal display through an acryl-based adhesive agent interposed therebetween such that the polarizing plate C becomes the liquid crystal side. In this way, an image display device was obtained. Here, in the adhesion of the viewing angle controlling system D, the absorption axis direction of the polarizing plate C was made to be consistent with the absorption axis direction of the polarizing plate before peeling off.

Example 2

Formation of a Viewing Angle Controlling System

An acryl-based pressure-sensitive adhesive agent was used to cause the polarizing plate C to adhere onto one of the principle surfaces of the polarizing plate B produced in Production Example 2 such that the angle made between a plane including the normal line of the principle surface of the polarizing plate B and the absorption axis thereof, and the absorption axis of the polarizing plate C is 90°. In this way, a "viewing angle controlling system E" was formed.
(Formation of an Image Display Device)

An image display device was obtained in the same way as in Example 1 except that the viewing angle controlling system E was used instead of the viewing angle controlling system D. Here, in the adhesion of the viewing angle controlling system E, the system was arranged such that the electric field direction in Production Example 2 (i.e., the absorption axis direction of the polarizing plate B) becomes a downward direction from the screen on the viewing side.

Comparative Example 1

Formation of an Image Display Device

An image display device was obtained in the same way as in Example 1 except that the polarizing plate C was used instead of the viewing angle controlling system D.
(Evaluation Test)

Figure 15A:
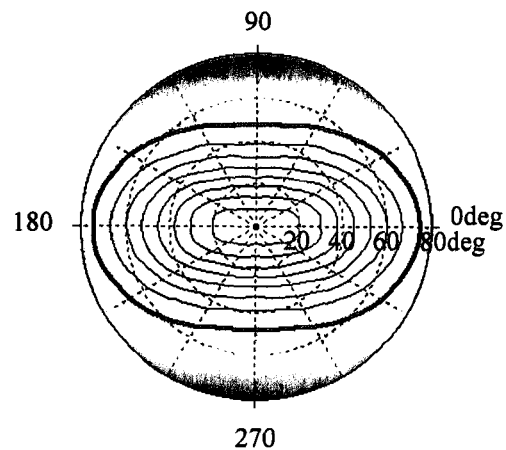
FIGS. 15A, 15B, and 15C are drawings showing evaluation results of examples and comparative example of the invention.
Figure 15B:
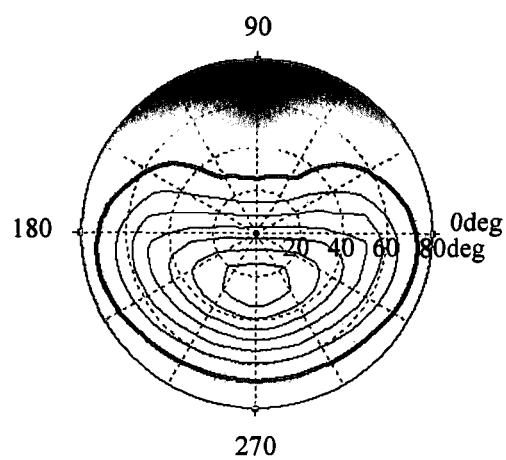
Figure 15C:
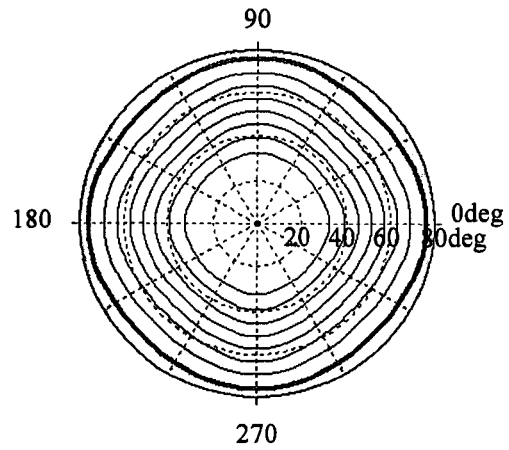

For each of the image display devices obtained in examples and comparative example, the viewing angle property (the dependency of the brightness on the viewing angle) was evaluated by use of a conoscope when the image display device was made into a white display state. The results are shown in FIGS. 15A, 15B and 15C. In each of FIGS. 15A, 15B, and 15C, the outermost curve, which is drawn with a thick line, represents an equi-brightness curve on which the brightness was 50 cd/m$^2$.

The viewing-angle-controls of examples and comparative example are evaluated with reference to the equi-brightness curves, on which the brightness was 50 cd/m$^2$. In Comparative Example 1 shown in FIG. 15C, the angle in which the brightness was 50 cd/m$^2$ was 75° in each of the vertical direction (from 90 to 270°) and the horizontal direction (from 0 to 180°). In other words, in the case of using a polarizing plate in which viewing-angle-control is not made as in Comparative Example 1, information on the screen can be viewed along all directions. Thus, there may be a high possibility that the information is peeped by any other person.

On the other hand, in Example 1 shown in FIG. 15A, the angle in which the brightness was 50 cd/m$^2$ was 75° in the horizontal direction in the same as in Comparative Example 1 but was 45° in the vertical direction. In other words, it is understood that light in the horizontal direction was not limited while light in the vertical direction was restricted in the emission angle thereof so that viewing-angle-control was made. Here, in Example 2 shown in FIG. 15B, the angle in which the brightness was 50 cd/m$^2$ was 70° in the horizontal direction, which was similar to the angles in Comparative Example 1 and Example 1, but was 25° in the upward direction and 65° in the downward direction. As a result, asymmetric emission property in the vertical direction was realized. It is understood from this result that emission of light in the upward direction can be restricted by use of polarizers having an inclined absorption axis.

Further, in Comparative Example 1, the maximum brightness was 515 cd/m$^2$ along the front direction. In Example 1, the maximum brightness was 450 cd/m$^2$ along the front direction; and in Example 2, the maximum brightness, which was along a 25°-downward direction, was 385 cd/m$^2$. Even when the viewing-angle-control is made by use of the viewing angle controlling system of the invention, a reduction in white brightness in the direction along which the viewing angle should be kept is small so that the viewability of the screen can be kept.

As described above, according to the viewing angle controlling system of the invention, an invisible region, which has a small brightness, can be caused to have directivity. Thus, it is understood that the viewing-angle-control can be attained. Here, the VA liquid crystal panel used in each of the examples had rotational symmetry at intervals of 90°, wherein the viewing angle in the vertical direction was substantially equal to that in the horizontal direction, as shown in FIG. 15C as illustrated in Comparative Example 1. Accordingly, when the direction of the display device is rotated at an angle of 90°, viewing-angle-control in the horizontal direction can also be attained in the same manner as in the Examples.

What is claimed is:

1. A viewing angle controlling system, comprising a first polarizer and a second polarizer,
   wherein the first polarizer and the second polarizer are each in the form of a film,
   wherein the first polarizer and the second polarizer comprise an absorption dichroic material,
   wherein the alignment of the first polarizer and the second polarizer is fixed,
   wherein the first polarizer has an absorption axis in its film plane,
   wherein the second polarizer comprises a dichroic compound that is aligned in a liquid crystal polymer matrix,
   wherein the alignment of the dichroic compound is fixed, and
   wherein the second polarizer has an absorption axis in the range of angle from 0 to 45° from the normal line of its film plane.

2. The viewing angle controlling system according to claim 1, wherein the absorption axis of the second polarizer is inclined from the normal line direction of the film plane, and the angle made between a plane including the normal line of the film plane of the second polarizer and the absorption axis thereof, and the absorption axis of the first polarizer is 90°±5°.

3. The viewing angle controlling system according to claim 1, further comprises a medium between the first polarizer and the second polarizer,
wherein the medium does not cause a substantial change of the polarization state of light in the normal line direction of the film plane of the second polarizer.

4. The viewing angle controlling system according to claim 3, wherein the in-plane retardation of the medium between the first polarizer and the second polarizer is up to 40 nm.

5. The viewing angle controlling system according to claim 3, wherein the slow axis of the medium between the first polarizer and the second polarizer is parallel or perpendicular to the absorption axis of the first polarizer.

6. The viewing angle controlling system according to claim 1, wherein the thickness direction retardation of the medium between the first polarizer and the second polarizer is up to 60 nm.

7. The viewing angle controlling system according to claim 1, wherein the first polarizer and the second polarizer are adhered and integrated with each other with a pressure-sensitive adhesive layer and/or an adhesive layer interposed therebetween.

8. The viewing angle controlling system according to claim 1, which has a pressure-sensitive adhesive layer over at least one of a first-polarizer-side principle surface or a second-polarizer-side principle surface.

9. An image display device, wherein the viewing angle controlling system as recited in claim 1 is arranged over at least one principle surface of a display panel.

10. The image display device according to claim 9, wherein the first polarizer-side principle surface of the viewing angle controlling system is arranged to be positioned on the display panel side.

11. The image display device according to claim 9, wherein the display panel and the viewing angle controlling system are adhered and integrated with each other with a pressure-sensitive adhesive layer and/or an adhesive layer interposed therebetween.

12. The image display device according to claim 9, wherein a transparent plate is arranged over at least one principle surface of the display panel, and the transparent plate and the viewing angle controlling system are adhered and integrated with each other with a pressure-sensitive adhesive layer and/or an adhesive layer interposed therebetween, thereby rendering the second-polarizer principle surface side of the display panel side.

13. The image display device according to claim 9, which shows a viewing-angle-restricted direction perpendicular to the absorption axis direction of the first polarizer.

14. The image display device according to claim 9, wherein the display panel is a liquid crystal panel having a polarizer over at least one principle surface of a liquid crystal cell, and the polarizer functions as the first polarizer of the viewing angle controlling system.

15. The image display device according to claim 9, wherein the display panel is a selfluminous-type display device, and the viewing angle controlling system is arranged on the viewing side of the display panel.

16. The image display device according to claim 15, which has a circular polarization means between the first polarizer of the viewing angle controlling system and the display panel, wherein the circular polarization means converts linearly polarized light into approximate circularly polarized light.

17. The image display device according to claim 13, wherein the display panel is a liquid crystal panel having a polarizer over at least one principle surface of a liquid crystal cell,
the image display device has a light source on one side of the liquid crystal panel, and also has a prism sheet which condenses light rays emitted to any one of directions between the light source and the liquid crystal panel, and
the viewing-angle-restricted direction perpendicular to the absorption axis direction of the first polarizer and the direction in which the brightness is decreased by the prism sheet are substantially parallel to each other.

18. An image display device, wherein the viewing angle controlling systems as recited in claim 1 are arranged over both the principle surfaces of a display panel, and the absorption axis direction of the first polarizer of the viewing angle controlling system on the one principle surface of the display panel and the absorption axis direction of the first polarizer of the viewing angle controlling system on the other principle surface of the display panel are substantial parallel or perpendicular to each other.

19. The viewing angle controlling system according to claim 3, wherein the medium is selected from the group consisting of pressure-sensitive adhesive layer, adhesive layer and protective film.

20. The viewing angle controlling system according to claim 2, wherein the first polarizer and the second polarizer are O type polarizers.

21. The viewing angle controlling system according to claim 5, wherein the slow axis of the medium between the first polarizer and the second polarizer is parallel to the absorption axis of the first polarizer.

* * * * *